US010462435B2

(12) United States Patent
Furuya et al.

(10) Patent No.: US 10,462,435 B2
(45) Date of Patent: Oct. 29, 2019

(54) IMAGE DISPLAY DEVICE AND SCREEN FOR CAR WINDSHIELD AND MANUFACTURING THEREOF

(71) Applicant: Panasonic Intellectual Property Management Co., Ltd., Osaka (JP)

(72) Inventors: Hiroyuki Furuya, Osaka (JP); Akira Kurozuka, Osaka (JP); Yuta Yamamoto, Kyoto (JP); Susumu Uragami, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 105 days.

(21) Appl. No.: 15/726,449

(22) Filed: Oct. 6, 2017

(65) Prior Publication Data

US 2018/0139418 A1    May 17, 2018

(30) Foreign Application Priority Data

Nov. 11, 2016  (JP) ................... 2016-220318
Mar. 8, 2017   (JP) ................... 2017-044418

(51) Int. Cl.
*G02B 26/08* (2006.01)
*H04N 9/31* (2006.01)
*G02B 27/01* (2006.01)
*G02B 3/00* (2006.01)
*G02B 26/12* (2006.01)
(Continued)

(52) U.S. Cl.
CPC ......... *H04N 9/3141* (2013.01); *G02B 3/0043* (2013.01); *G02B 26/0841* (2013.01); *G02B 26/123* (2013.01); *G02B 27/0031* (2013.01); *G02B 27/0101* (2013.01); *H04N 9/3135* (2013.01); *G02B 2027/0112* (2013.01); *G02B 2027/0118* (2013.01); *G03B 21/26* (2013.01); *G03B 21/62* (2013.01)

(58) Field of Classification Search
CPC .. H04N 9/3141; H04N 9/3135; G02B 3/0043; G02B 26/0841; G02B 26/123; G02B 27/0031; G02B 27/0101; G02B 2027/0112; G02B 2027/0118; G03B 21/26; G03B 21/62
See application file for complete search history.

(56) References Cited

U.S. PATENT DOCUMENTS

2015/0070770 A1    3/2015  Nomoto et al.
2017/0315353 A1*  11/2017  Saisho ............... G02B 26/101
2018/0067308 A1*   3/2018  Sakai ................ G02B 27/0101

FOREIGN PATENT DOCUMENTS

JP    2016-090769    5/2016
WO    2013/153655    10/2013

* cited by examiner

*Primary Examiner* — Lisa S Landis
(74) *Attorney, Agent, or Firm* — McDermott Will & Emery LLP

(57) ABSTRACT

Image display device includes; light source; screen on which an image is drawn by being scanned two-dimensionally by laser light; scanner that causes the laser light to scan the screen; mirror drive circuit that chives scanner; and an optical system that generates a virtual image of the image drawn on screen. On screen, there are arranged a plurality of lens regions so as to be arranged individually in a first direction and a second direction perpendicular to the first direction, and mirror drive circuit sets a plurality of scan lines such that a pitch of the scan lines can become smaller than a pitch of lens regions in the second direction.

18 Claims, 21 Drawing Sheets

(51) Int. Cl.
 _G02B 27/00_  (2006.01)
 _G03B 21/26_  (2006.01)
 _G03B 21/62_  (2014.01)

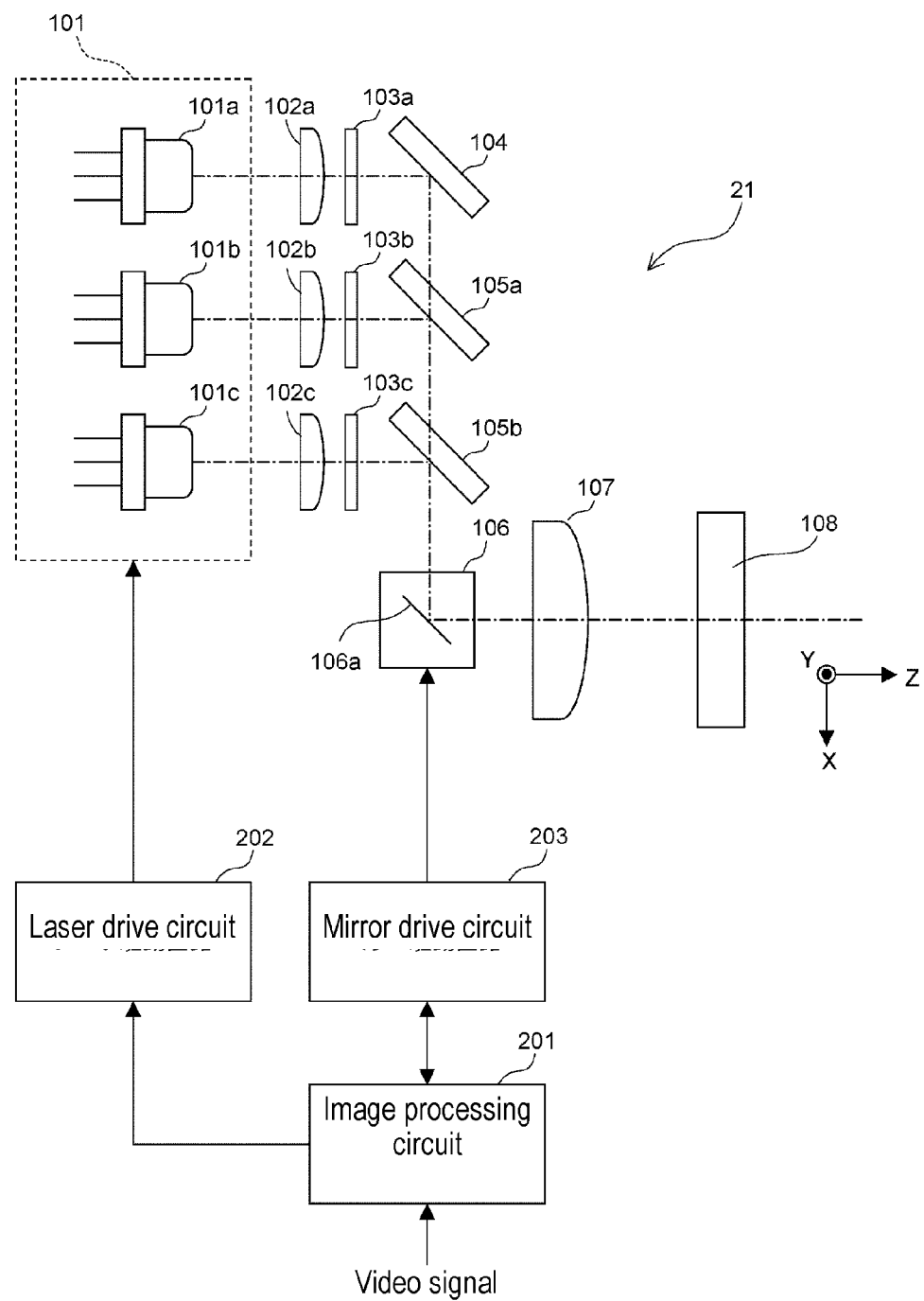

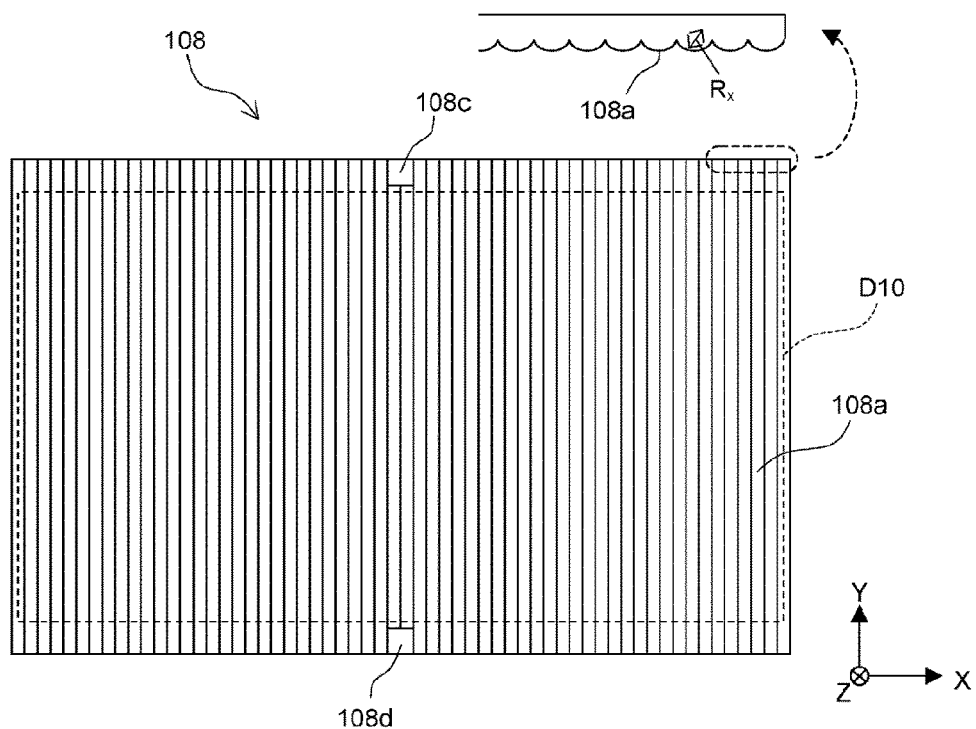
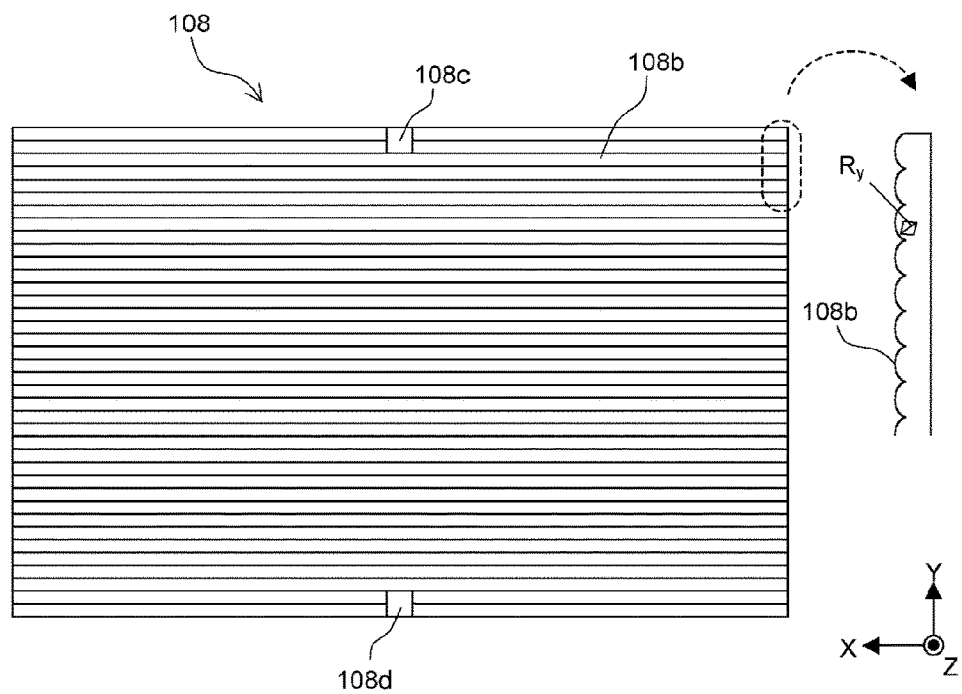

IMAGE DISPLAY DEVICE AND SCREEN FOR CAR WINDSHIELD AND MANUFACTURING THEREOF

BACKGROUND

1. Technical Field

The present disclosure relates to an image display device and a screen, which display an image, and for example, is suitable for being mounted on a moving body such as a passenger car.

2. Description of the Related Art

In recent years, development of an image display device called a head-up display has been advanced, and the head-up display concerned has been mounted on a moving body such as a passenger car. For example, in the head-up display mounted on the passenger car, light modulated by a video signal is projected onto a windshield, and reflected light of the modulated light is made incident onto driver's eyes. In this way, the driver can see a virtual image of an image in front of the windshield. For example, a vehicle speed, an outside air temperature or the like is displayed as the virtual image.

In the head-up display, a laser light source can be used as a light source. In this case, the laser light scans a screen while being modulated in response to the video signal. Thereafter, the laser light is diffused by the screen, and is guided to an eye box near the driver's eyes. In this way, the driver can see the image (virtual image) satisfactorily and stably even if he/she moves the head to some extent. The eye box has, for example, an oblong rectangular shape.

PTL 1 listed below describes an image display device in which a screen is constituted of a microlens array having a plurality of microlenses arranged thereon. Here, in order to cause an observer to clearly view an inner portion of an image, on which relatively important information is displayed, with high luminance, curvature radii of the microlenses are set smaller as going farther from a center of the microlens array.

Moreover, PTL 2 listed below describes an image display device in which a screen is constituted of a microlens array having a plurality of microlenses arranged thereon. Here, the laser light is caused to scan the screen at a high speed in a main scanning direction, and in addition, the laser light is caused to scan the screen in a sub scanning direction perpendicular to the main scanning direction, whereby the screen is scanned two-dimensionally by the laser light.

CITATION LIST

Patent Literature

PTL 1: WO 2013/153655
PTL 2: Unexamined Japanese Patent Publication No. 2016-90769

SUMMARY

In such a configuration in which the laser light scans the screen as described above, the scanning speed of the laser light decreases as going from a center of the screen to an edge of the screen. Therefore, in the image on the screen, such an edge region in the scanning direction becomes brighter than the center. When the brightness of the image is uneven as described above, the observer who saw the image may feel uncomfortable. It is preferable that the image visually recognized by the observer have brightness, which is as uniform as possible, as a whole.

Moreover, when the screen is constituted of the microlens array as described above, in usual, a spot diameter of the laser light on the screen is adjusted so as to be equal to or less than a width of each of the lenses. Then, the laser light is caused to scan a group of the lenses, which are arranged in one line in the scanning direction, such that a beam spot of the laser light can pass through a center of the group of the lenses. After the scanning for such a lens group of one line is ended, similar scanning is performed for a next line adjacent to this line. In this way, the lens groups of all the lines on the screen are sequentially scanned, and one image is generated on the screen.

By the inventors, it has been confirmed that, in such a scanning method, when the beam spot is shifted from the center of the lens group of each of the lines in a direction perpendicular to the scanning direction, then interference fringes are generated in the display image, and visibility of the display image is degraded. Therefore, in this scanning method, positions of an optical system, the screen and the like have had to be strictly adjusted such that the beam spot can passes through the center of each of the lens groups, and complicated work has been required. Moreover, even if the positions of the optical system, the screen and the like are properly adjusted, when the screen is deformed and so on due to a subsequent temperature change and the like, a positional shift occurs between a scanning position of the beam spot and the lens group. Therefore, when the above-described scanning method is used, it has been extremely difficult to suppress the interference fringes and to satisfactorily maintain visibility of the display image.

In consideration of such a problem, it is an object of the present disclosure to provide an image display device, which can easily constitute a screen and is capable of making brightness of an entire image nearly even, and to provide a screen for use in the image display device.

It is another object of the present disclosure to provide an image display device, which, in an image display device that generates a display image by scanning a screen by laser light, is capable of simply and smoothly suppressing degradation of visibility of the display image due to interference fringes.

A first aspect of the present disclosure relates to an image display device. The image display device according to this aspect includes: a light source; a screen; a scanner; and an optical system. The light source emits laser light. The screen draws an image by being scanned by the laser light. The scanner causes the laser light, which is emitted from the light source, to scan the screen. The optical system generates a virtual image of the image, which is drawn on the screen, by the laser light transmitted through the screen. Here, the screen is configured such that, in a drawing region on which the image is drawn, a divergence angle can be constant in a predetermined range in a center in a scanning direction, and the divergence angle can become gradually larger toward ends in ranges on both sides in the scanning direction, the both sides excluding the predetermined range.

In accordance with the image display device according to this aspect, the screen is configured such that, in the drawing region on which the image is drawn, the divergence angle can become gradually larger toward ends in ranges on both sides in the scanning direction, the both sides excluding the predetermined range. Therefore, light quantities of the light of both side portions in the eye box are weakened toward the ends in comparison with the central portion. Therefore, the brightness of the entire image in the eye box can be made nearly even. Moreover, since the divergence angle of the screen is constant in the predetermined range in the center of the scanning direction, it is unnecessary to precisely adjust the divergence angle in the entire range in the scanning direction. Hence, the screen can be easily constituted.

A second aspect of the present disclosure relates to a screen on which an image is drawn by being scanned by laser light. The screen according to this aspect is configured such that, in a drawing region on which the image is drawn, a divergence angle can be constant in a predetermined range in a center in a scanning direction, and the divergence angle can become gradually larger toward ends in ranges on both sides in the scanning direction, the both sides excluding the predetermined range.

By using the screen according to this aspect for the image display device, similar effects to those in the above-described first aspect can be exerted.

A third aspect of the present disclosure relates to an image display device. The image display device according to this aspect includes: a light source; a screen; a scanner; a drive unit; and an optical system. The light source emits laser light. The screen draws an image by being scanned two-dimensionally by the laser light. The scanner causes the laser light to scan the screen. The drive unit drives the scanner such that the laser light can move on the screen along a plurality of scan lines parallel to a first direction. The optical system generates a virtual image of the image drawn on the screen. On the screen, a plurality of lens regions are arranged so as to be individually arranged in the first direction and a second direction perpendicular to the first direction. The drive unit sets the plurality of scan lines such that a pitch of the scan lines can become smaller than a pitch of the lens regions in the second direction.

In accordance with the image display device according to this aspect, the interference fringes, which are generated in the display image when the respective scan lines are scanned, are mutually averaged at the time of being recognized by human eyes, and the interference fringes become inconspicuous. In this way, there can be suppressed the degradation of the visibility of the display image due to the interference fringes. Moreover, the image display device according to this aspect has such a configuration of mutually averaging the interference fringes which are based on the respective scan lines. Therefore, even if the screen is deformed and so on due to the temperature change or the like, and how the interference fringes which are based on the respective scan lines are generated changes, the interference fringes are averaged with this change at any time, and become inconspicuous on the display image. Hence, even if the screen is deformed and so on due to the temperature change or the like, the visibility of the display image is maintained satisfactorily.

As described above, in accordance with inventions according to the present disclosure, there can be provided the image display device, which can easily constitute the screen and is capable of making the brightness of the entire image nearly even, and can be provided the screen for use in the image display device.

Moreover, in accordance with the inventions according to the present disclosure, with such an extremely simple configuration of adjusting the relationship between the pitch of the scan lines and the pitch of the lens regions, the degradation of the visibility of the display image due to the interference fringes can be suppressed smoothly.

Effects and meanings of the inventions according to the present disclosure will be further clarified by the following description of exemplary embodiments. However, the exemplary embodiments described below are merely examples of implementing the inventions according to the present disclosure, and the present disclosure is never limited to what is described in the following exemplary embodiments.

BRIEF DESCRIPTION OF THE DRAWINGS

FIG. 2 is a diagram showing configurations of an irradiation light generator of the image display device according to the exemplary embodiment and of a circuit for use in the irradiation light generator;

FIG. 3A is a diagram schematically showing a state of a screen according to the exemplary embodiment as seen from an incident side of laser light;

FIG. 3B is a diagram schematically showing a state of the screen according to the exemplary embodiment as seen from an emission side of laser light;

DETAILED DESCRIPTION

Exemplary embodiments of the present disclosure will now be described with reference to the accompanying drawings. For convenience, X, Y and Z-axes perpendicular to one another are added to respective drawings as appropriate.

Figure 1A:
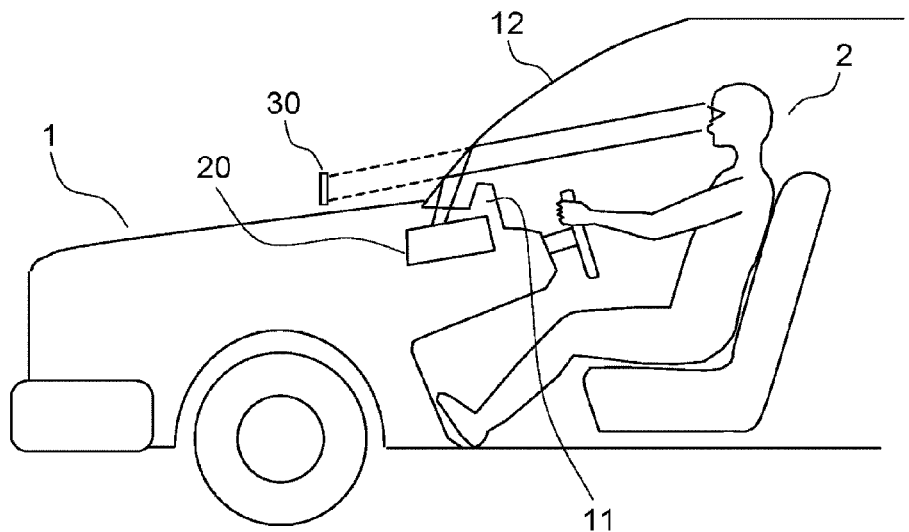
FIG. 1A is a view schematically showing a usage form of an image display device according to an exemplary embodiment.
Figure 1B:
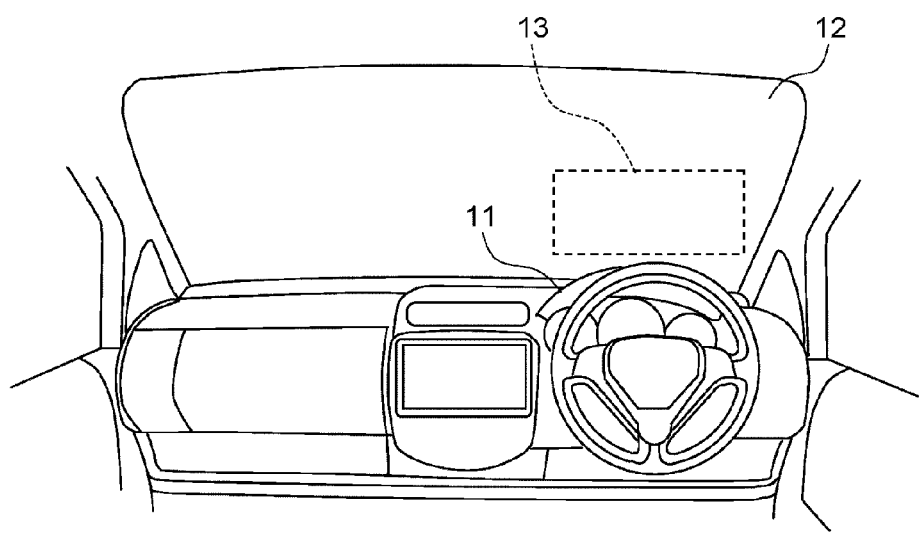
FIG. 1B is a view schematically showing the usage form of the image display device according to the exemplary embodiment.

FIGS. 1A and 1B are views schematically showing a usage form of image display device 20. FIG. 1A is a schematic view showing an inside of passenger car 1 as seen from a side of passenger car 1, and FIG. 1B is a view of a front of passenger car 1 in a driving direction from the inside of passenger car 1.

In this exemplary embodiment, inventions according to the present disclosure are applied to a vehicle head-up display. As shown in FIG. 1A, image display device 20 is installed inside dashboard 11 of passenger car 1.

As shown in FIG. 1A and FIG. 1B, image display device 20 projects laser light, which is modulated by a video signal, onto projection region 13 near a driver's seat on a lower side of windshield 12. The laser light is reflected by projection region 13, and is applied to an oblong region (eye box region) around a position of driver 2's eyes. In this way, predetermined image 30 is displayed as a virtual image in a viewing field in front of driver 2. Driver 2 can superimpose image 30, which is a virtual image, on a scene in front of windshield 12, and can view image 30. That is, image display device 20 forms image 30, which is a virtual image, in a space in front of projection region 13 of windshield 12.

Figure 1C:
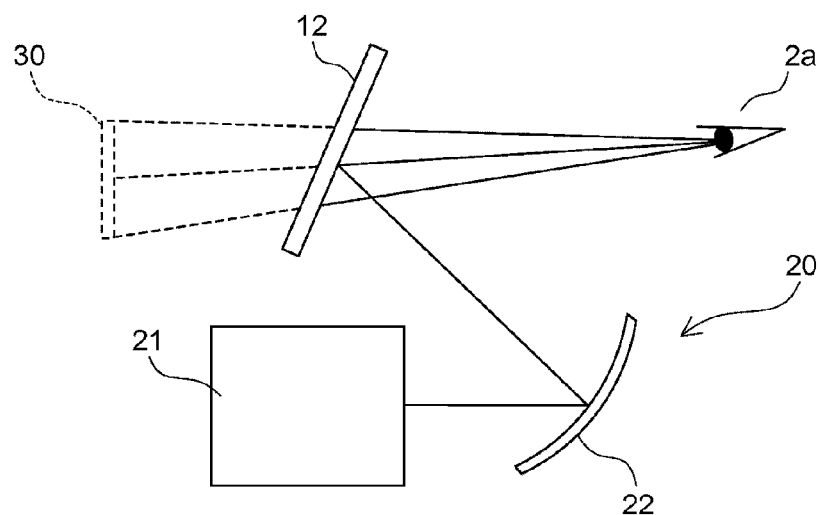
FIG. 1C is a view schematically showing a configuration of the image display device according to the exemplary embodiment.

FIG. 1C is a view schematically showing a configuration of image display device 20.

Image display device 20 includes irradiation light generator 21 and mirror 22. Irradiation light generator 21 emits the laser light modulated by the video signal. Mirror 22 has a curved reflecting surface, and reflects the laser light, which is emitted from irradiation light generator 21, toward windshield 12. The laser light reflected by windshield 12 is applied to eye 2a of driver 2. An optical system of irradiation light generator 21 and mirror 22 are designed such that image 30 as a virtual image can be displayed in a predetermined size in front of windshield 12.

FIG. 2 is a diagram showing configurations of irradiation light generator 21 of image display device 20 and of a circuit for use in irradiation light generator 21.

Irradiation light generator 21 includes light source 101, collimator lenses 102a to 102c, apertures 103a to 103c, mirror 104, dichroic mirrors 105a and 105b, scanner 106, correction lens 107, and screen 108.

Light source 101 includes three laser light sources 101a to 101c.

Laser light source 101a emits laser light having a red wavelength included in a range of 600 nm to 700 nm, laser light source 101b emits laser light having a green wavelength included in a range of 500 nm to 600 nm, and laser light source 101c emits laser light having a blue wavelength included in a range of 400 nm to 500 nm. In this exemplary embodiment, in order to display a color image as image 30, light source 101 includes these three laser light sources 101a to 101c. When a monochromatic image is displayed as image 30, light source 101 may include only one laser light source corresponding to a color of the image. Laser light sources 101a to 101c are made of, for example, semiconductor lasers.

Such pieces of the laser light emitted from laser light sources 101a to 101c are converted into pieces of parallel light by collimator lenses 102a to 102c, respectively. The pieces of the laser light, which are transmitted through collimator lenses 102a to 102c, are shaped into circular beams of substantially the same size by apertures 103a to 103c, respectively. That is, apertures 103a to 103c constitute a beam shaper for aligning a beam size and beam shape of the pieces of the laser light, which are individually emitted from laser light sources 101a to 101c, with one another.

Note that, in place of collimator lenses 102a to 102c, shaping lenses may be used, which shape the laser light into a circular beam shape and collimate the laser light. In this case, the apertures can be omitted.

Thereafter, with regard to the pieces of the laser light of the respective colors, which are emitted from laser light sources 101a to 101c, optical axes of the laser light are aligned with one another by mirror 104 and two dichroic mirrors 105a and 105b. Mirror 104 substantially totally reflects the red laser light transmitted through collimator lens 102a. Dichroic mirror 105a reflects the green laser light transmitted through the collimator lens 102b, and transmits therethrough the red laser light reflected by mirror 104. Dichroic mirror 105b reflects the blue laser light transmitted through collimator lens 102c, and transmits therethrough the red laser light and the green laser light, which have passed through dichroic mirror 105a. Mirror 104 and two dichroic mirrors 105a and 105b are disposed so as to align the optical axes of the pieces of laser light of the respective colors, which are emitted from laser light sources 101a to 101c, with one another. Mirror 104 and two dichroic mirrors 105a and 105b constitute an optical axis aligner for aligning the optical axes of the pieces of the laser light, which are individually emitted from the laser light sources 101a to 101c, with one another.

Scanner 106 reflects the pieces of the laser light of the respective colors which have passed through dichroic mirror 105b. Scanner 106 is made of, for example, a micro electro mechanical system (MEMS) mirror, and includes a configuration to rotate mirror 106a, onto which the pieces of the laser light of the respective colors having passed through dichroic mirror 105b is made incident, around an axis parallel to a Y-axis and an axis parallel to an X-axis in response to a drive signal. The mirror 106a is rotated as described above, whereby a reflection direction of the laser light changes in an in-plane direction of an X-Z plane and an in-plane direction of a Y-Z plane. In this way, as will be described later, screen 108 is two-dimensionally scanned by the pieces of the laser light of the respective colors.

Note that, although scanner 106 is constituted of the MEMS mirror of such a two-axis driving system here, scanner 106 may have another configuration. For example, scanner 106 may be configured by combining a mirror, which is rotationally driven around the axis parallel to the Y-axis, and a mirror, which is rotationally driven around the axis parallel to the X-axis, with each other.

Correction lens 107 is designed to direct the pieces of the laser light of the respective colors in a positive direction of a Z-axis irrespective of a swing angle of the laser light by scanner 106.

An image is formed on screen 108 by causing the laser light to scan the same, and screen 108 has a function to diffuse the laser light, which is made incident thereonto, to a region (eye box region) around a position of eye 2a of driver 2. Screen 108 is made of a transparent resin such as polyethylene terephthalate (PET). A configuration of screen 108 will be described later with reference to FIG. 3A to FIG. 7B.

Image processing circuit 201 includes an arithmetic processing unit such as a central processing unit (CPU) and a memory, processes a video signal, which is input thereto, and controls laser drive circuit 202 and mirror drive circuit 203. Laser drive circuit 202 changes emission intensities of laser light sources 101a to 101c in response to a control signal from image processing circuit 201. Mirror drive circuit 203 drives mirror 106a of scanner 106 in response to a control signal from image processing circuit 201. Control in image processing circuit 201 at the time of an image display operation will be described later with reference to FIG. 6B and FIG. 11A.

FIG. 3A and FIG. 3B are diagrams schematically showing a state of screen 108 as seen from an incident side and emission side of the laser light, respectively. On an upper side of FIG. 3A, an enlarged view of a vicinity of a corner on a positive side of the X-axis of screen 108 and a positive side of the Y-axis of screen 108 as seen from a positive side of the Y-axis is schematically shown. Moreover, on a right side of FIG. 3B, an enlarged view of a vicinity of a corner on a negative side of the X-axis of screen 108 and the positive side of the Y-axis of screen 108 as seen from a negative side of the X-axis is schematically shown.

As shown in FIG. 3A, a plurality of first lens portions 108a for diverging the laser light in the X-axis direction are formed on a surface on a laser light incident side of screen 108 (that is, a surface on a negative side of the Z-axis) are formed so as to be arranged in the X-axis direction. A shape of first lens portions 108a as seen in the Y-axis direction is a substantially circular arc shape. A width in the X-axis direction of each of first lens portions 108a is, for example, 50 μm.

As shown in FIG. 3B, a plurality of second lens portions 108b for diverging the laser light in the Y-axis direction are formed on a surface on a laser light emission side of screen 108 (that is, a surface on a positive side of the Z-axis) are formed so as to be arranged in the Y-axis direction. A shape of second lens portions 108b as seen in the X-axis direction is a substantially circular arc shape. A width in the Y-axis direction of each of second lens portions 108b is, for example, 70 μm. The width in the Y-axis direction of each of second lens portions 108b may be the same as the width in the X-axis direction of each of first lens portions 108a.

Figure 4:
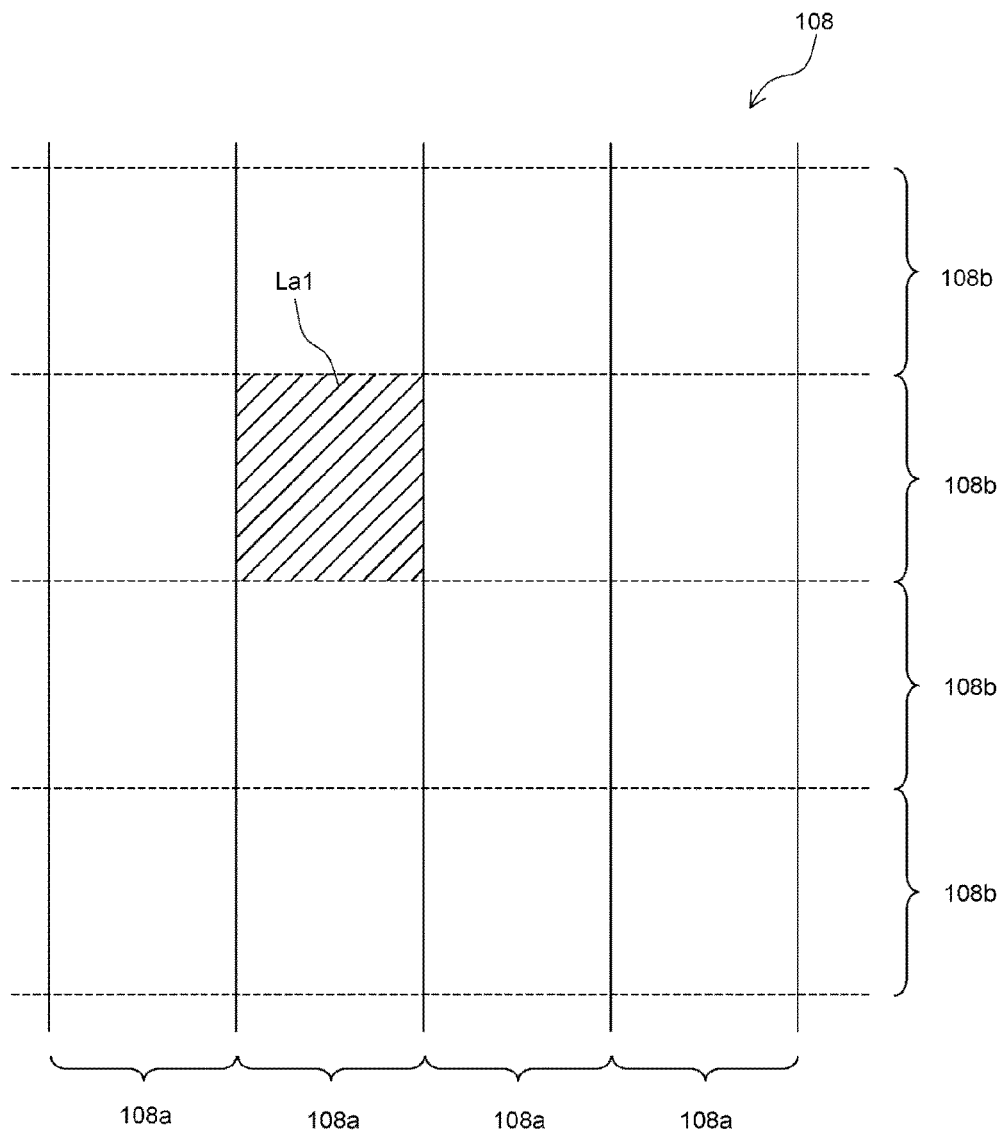
FIG. 4 is an enlarged view of a part of the screen according to the exemplary embodiment.

FIG. 4 is an enlarged view showing a part of screen 108. FIG. 4 shows an enlarged part of screen 108 when screen 108 is seen in the incident direction of the laser light (that is, in the positive direction of the Z-axis). In FIG. 4, solid lines indicate boundaries of first lens portions 108a, and broken lines indicate boundaries of second lens portions 108b.

As shown in FIG. 4, when seen in the incident direction of the laser light (that is, in the positive direction of the Z-axis), a region where each of first lens portions 108a and each of second lens portions 108b overlap each other (that is, a hatched region) constitutes one lens region La1. Such lens regions La1 are arranged in line in the X-axis direction and in line in the Y-axis direction. The laser light incident on each of lens regions La1 is diffused after being converged in the X-axis direction by first lens portion 108a, and is diffused after being converged in the Y-axis direction by second lens portion 108b. In this way, the laser light incident onto each of lens regions La1 is guided to an oblong region (eye box region) around the position of eye 2a of driver 2.

Here, curvature radius Rx of each of first lens portions 108a and a curvature radius Ry of second lens portion 108b are different from each other. Curvature radius Rx is set smaller than curvature radius Ry. Hence, a divergence angle of the laser light diverged after the laser light is converged by first lens portions 108a becomes larger than a divergence angle of the laser light diverged after the laser light is converged by second lens portions 108b. The curvatures of first lens portions 108a and second lens portions 108b are set as described above, whereby the laser light transmitted through screen 108 can be guided to the oblong region (eye box region) around the position of eye 2a of driver 2. The curvature radii of first lens portions 108a and second lens portions 108b are determined in response to the shape of the eye box region.

Returning to FIG. 3A, reference symbol D10 denotes a drawing region of screen 108. That is, on drawing region D10, screen 108 is scanned by the laser light, and an image is formed. Non-lens regions 108c and 108d of a predetermined size, which pass the incident light therethrough without diverging the same, are formed at positions above and below drawing region D10, respectively. Sizes of the non-lens regions 108c and 108d are set equal to each other. A width in the X-axis direction of non-lens regions 108c and 108d is, for example, 50 μm to 100 μm, and a width in the Y-axis direction of non-lens regions 108c and 108d is, for example, 100 μm to 200 μm.

Non-lens regions 108c and 108d are individually disposed at intermediate positions in the X-axis direction of screen 108. Disposed positions of non-lens regions 108c and 108d are not limited to the intermediate positions of the width in the X-axis direction of screen 108, and may be other positions. Moreover, a number of non-lens regions 108c and 108d does not each have to be one, and for example, two or more sets of non-lens regions 108c and 108d may be disposed with drawing region D10 interposed therebetween.

Figure 5A:
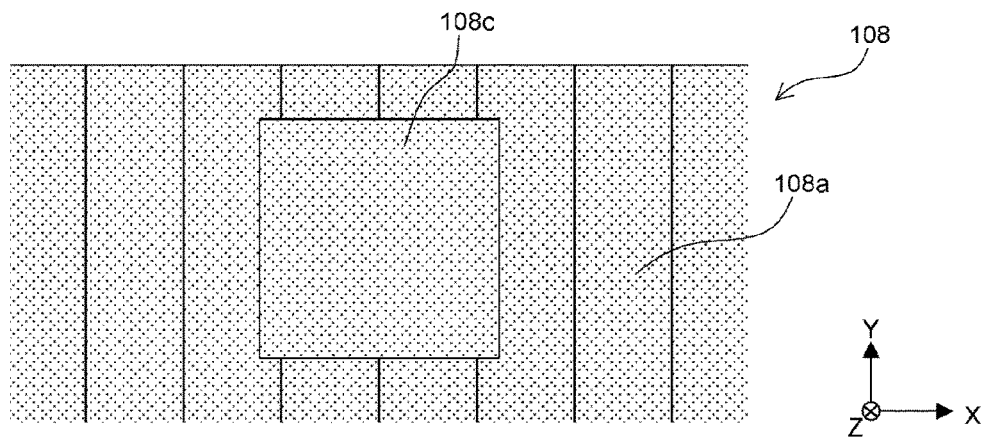
FIG. 5A is a diagram showing a configuration example of a non-lens region according to the exemplary embodiment.
Figure 5B:
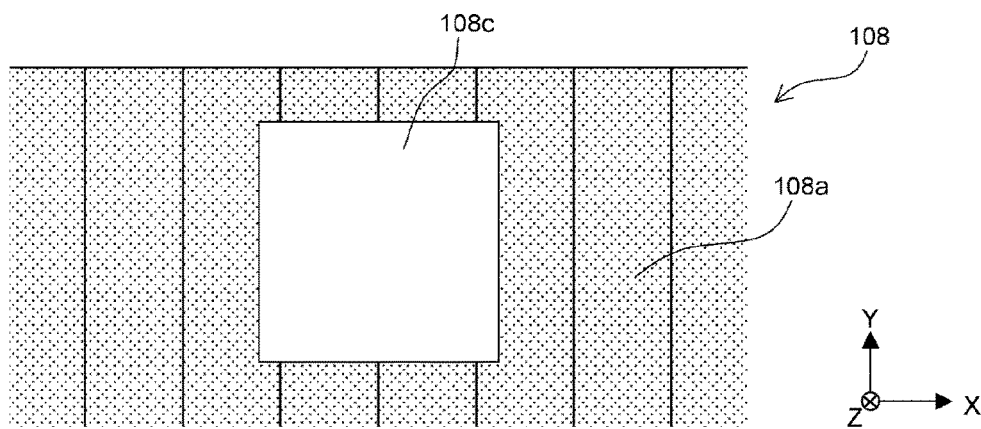
FIG. 5B is a diagram showing a configuration example of the non-lens region according to the exemplary embodiment.
Figure 5C:
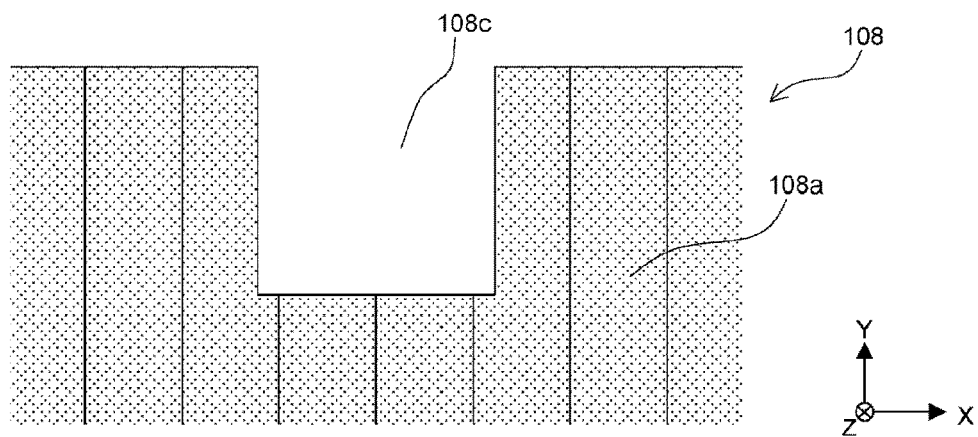
FIG. 5C is a diagram showing a configuration example of the non-lens region according to the exemplary embodiment.

FIG. 5A to FIG. 5C are diagrams showing configuration examples of non-lens region 108c.

In the configuration example of FIG. 5A, non-lens region 108c is configured by omitting first lens portion 108a and second lens portion 108b. That is, the surface of screen 108 on the laser light incident side (negative side on the Z-axis) and the surface of screen 108 on the laser light emission side (positive side on the Z-axis) of screen 108 are planes parallel to an X-Y plane in non-lens region 108c.

In the configuration example of FIG. 5B, there is formed a hole that penetrates screen 108 from the surface on the laser light incident side (negative side on the Z-axis) to the surface on the laser light emission side (positive side on the Z-axis), whereby non-lens region 108c is constituted. Moreover, in the configuration example of FIG. 5C, a rectangular recessed portion, which is recessed in the negative direction of the Y-axis from an end edge on the positive side of the Y-axis on screen 108, is formed, whereby non-lens region 108c is constituted.

The configuration of non-lens region 108c is not limited to the configurations of FIG. 5A to FIG. 5C, and other configurations may be adopted as long as the configurations allow the incident light to pass therethrough without diverging the same. For example, a shape of non-lens region 108c when seen in the Z-axis direction is not limited to a square, and may be another shape such as a circle.

Note that, though FIG. 5A to FIG. 5C show the configuration examples of non-lens region 108c disposed on the positive side of the Y-axis, non-lens region 108d disposed on the negative side of the Y-axis can also be formed as shown in FIGS. 5A to 5C.

Figure 6A:
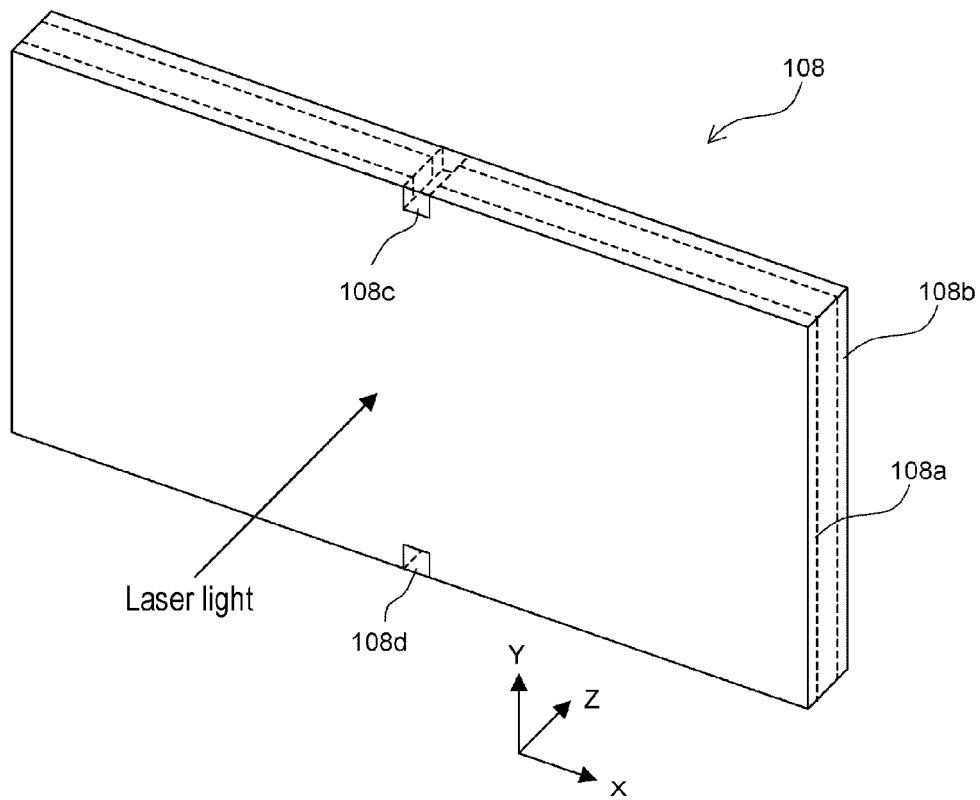
FIG. 6A is a perspective view schematically showing a configuration of the screen according to the exemplary embodiment.
Figure 6B:
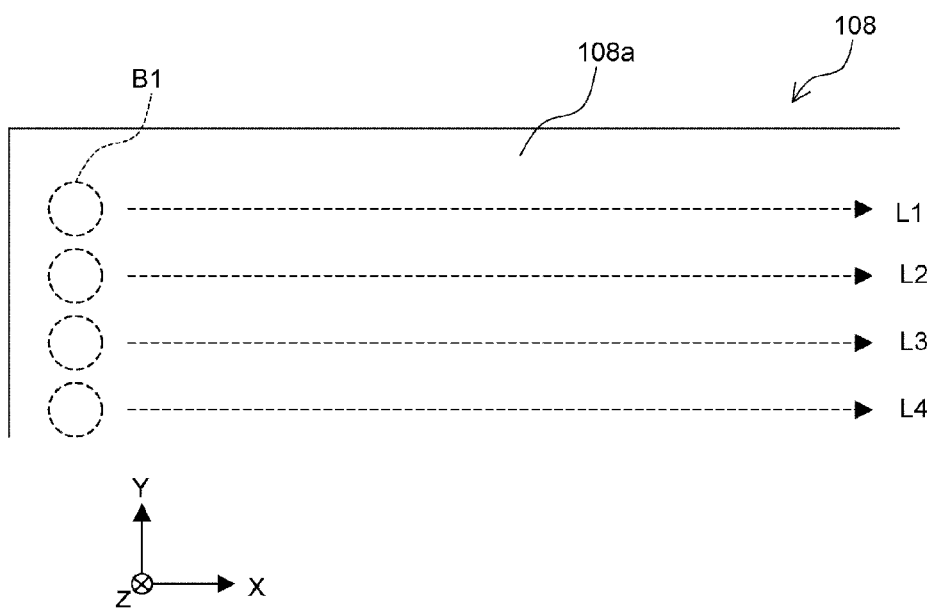
FIG. 6B is a diagram schematically showing a scanning method of the laser light for the screen according to the exemplary embodiment.

FIG. 6A is a perspective view schematically showing a configuration of screen 108. FIG. 6B is a diagram schematically showing a scanning method of the laser light for screen 108.

An incident surface (surface on the negative side of the Z-axis) of screen 108 having the above-described configuration is scanned in the positive direction of the X-axis by beam B1 in which the pieces of the laser light of the respective colors is superimposed on one another. On the incident surface of screen 108, scan lines L1 to Ln through which beam B1 passes are set beforehand at a constant interval in the Y-axis direction. Start positions of scan lines L1 to Ln coincide with one another in the X-axis direction, and end positions of scan lines L1 to Ln coincide with one another in the X-axis direction. Hence, a region that surrounds scan lines L1 to Ln is rectangular. A diameter of beam B1 is set smaller than the width of second lens portions 108b. For example, the diameter of beam B1 is set to approximately 35 μm to 65 μm.

Scan lines L1 to Ln are scanned by high frequency beam B1 in which the pieces of the laser light of the respective colors are modulated by the video signal, whereby an image is constituted. The image thus constituted is projected onto the region (eye box) around the position of eye 2a of driver 2 via screen 108, mirror 22 and windshield 12 (refer to FIG. 1C). In this way, driver 2 visually recognizes image 30 as a virtual image in a space in front of windshield 12.

Incidentally, as described above, in the configuration in which the laser light scans screen 108 by scanner 106 using the MEMS, a scanning speed of laser light decreases as going from the center of screen 108 toward both ends of screen 108 in the X-axis direction. Therefore, in the image on screen 108, regions on both ends in the scanning direction becomes brighter than the center. When the brightness of the image is uneven as described above, the observer who saw the image may feel uncomfortable. It is preferable that the image visually recognized by the observer have brightness, which is as even as possible, as a whole.

Accordingly, in this exemplary embodiment, screen 108 is configured such that, in drawing region D10 on which the image is drawn, the divergence angle in the X-axis direction can be constant in a predetermined range in the center of the scanning direction (X-axis direction), and the divergence angle in the X-axis direction can become gradually larger toward the end in the X-axis direction in ranges on both sides, which exclude the predetermined range.

Figure 7A:
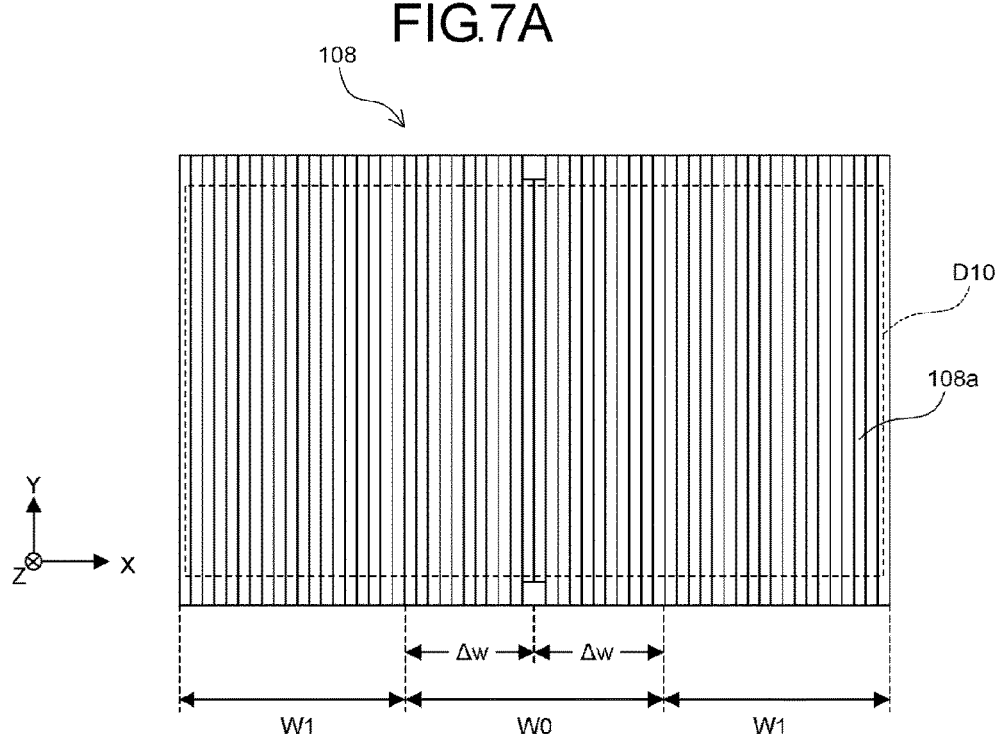
FIG. 7A is a diagram showing a region setting method for the screen according to the exemplary embodiment.
Figure 7B:
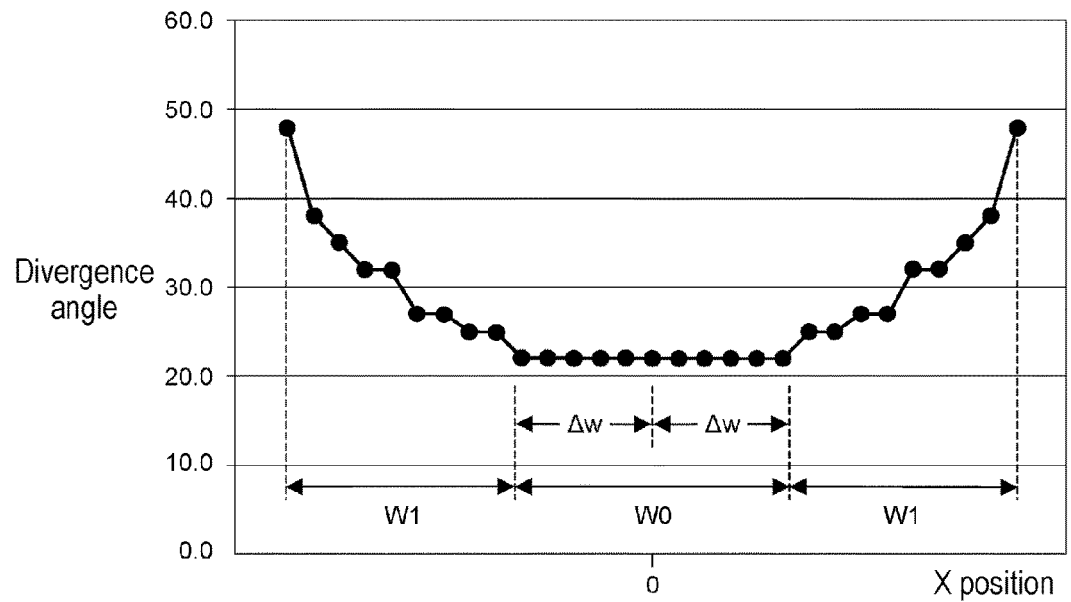
FIG. 7B is a diagram showing a divergence angle setting method for the screen according to the exemplary embodiment.

FIG. 7A is a diagram showing a region setting method for screen 108, and FIG. 7B is a diagram showing a divergence angle setting method for screen 108. In a graph of FIG. 7B, an axis of abscissas represents a position in the X-axis direction of screen 108, and an axis of ordinates represents the divergence angle (degree) in the X-axis direction. In the axis of abscissas, an intermediate position of the width in the X-axis direction of screen 108 (drawing region D10) is set to 0.

As shown in FIG. 7B, in drawing region D10 in screen 108, the divergence angle in the X-axis direction is set constant in predetermined range W0 in the center of the scanning direction (X-axis direction). Predetermined range W0 is a sum of a range of width Δw in the positive direction and a range of width Δw in the negative direction on the X-axis from the intermediate position in the X-axis direction of drawing region D10. Predetermined range W0 is set in a range of 40% or more to 50% or less of an entire range of drawing region D10 in the scanning direction (X-axis direction).

Moreover, screen 108 is set such that the divergence angle in the X-axis direction can become gradually larger toward the positive and negative ends of the X-axis in ranges W1 on both sides, which exclude predetermined range W0. More specifically, screen 108 is configured such that the divergence angle in the X-axis direction can become gradually larger toward the ends of ranges W1 on both sides in such a manner that the curvature of first lens portions 108a included in ranges W1 on both sides is changed.

In order to obtain a distribution of the divergence angle, which is shown in FIG. 7B, the curvature of first lens portions 108a gradually changes toward the edges in ranges W1 on both sides. Specifically, in ranges W1 on both sides, curvature radius Rx of first lens portions 108a is stepwise smaller toward the edges. In this way, in ranges W1 on both sides, the divergence angle in the X-axis direction changes stepwise from approximately 20 degrees to approximately 50 degrees.

Note that, in ranges W1 on both sides, the curvature of first lens portions 108a is set so as to be the same in a group and change stepwise in groups adjacent to each other when a plurality of first lens portions 108a adjacent to each other in the X-axis direction are taken as one group. Besides, the curvature may be different between first lens portions 108a adjacent to each other.

Curvature radius Rx of first lens portions 108a in predetermined range W0 is set such that the divergence angle in the X-axis direction can become approximately 20 degrees. Curvature radius Rx of first lens portions 108a in predetermined range W0 is, for example, 50 μm. Curvature radius Rx of first lens portions 108a and curvature radius Ry of second lens portions 108b in predetermined range W0 are set to, for example, Rx Ry=1:2.

Figure 8A:
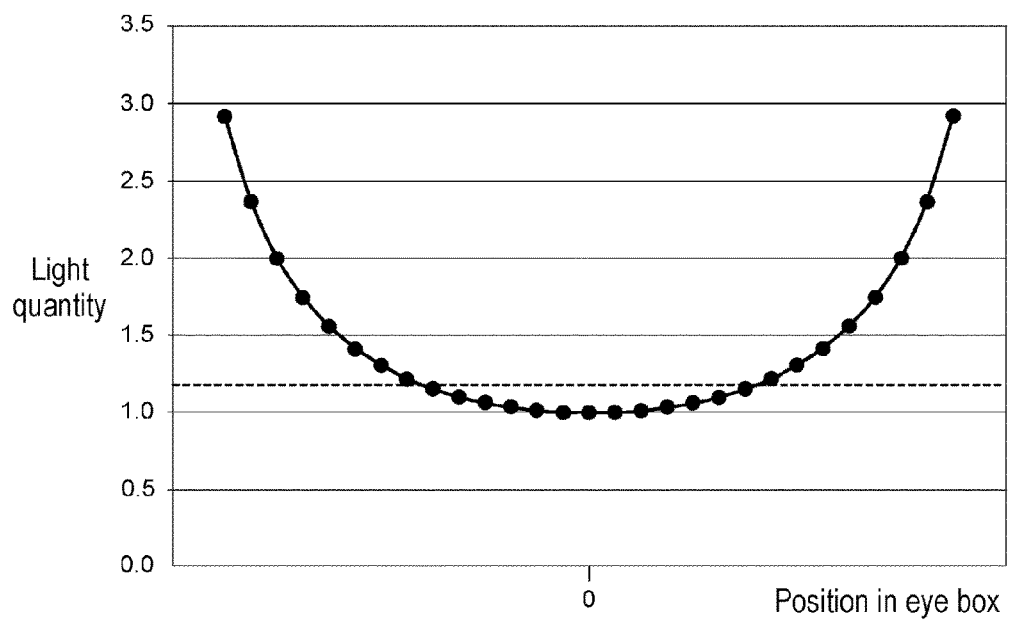
FIG. 8A is a graph showing a light quantity distribution in an eye box according to Comparative Example 1.
Figure 8B:
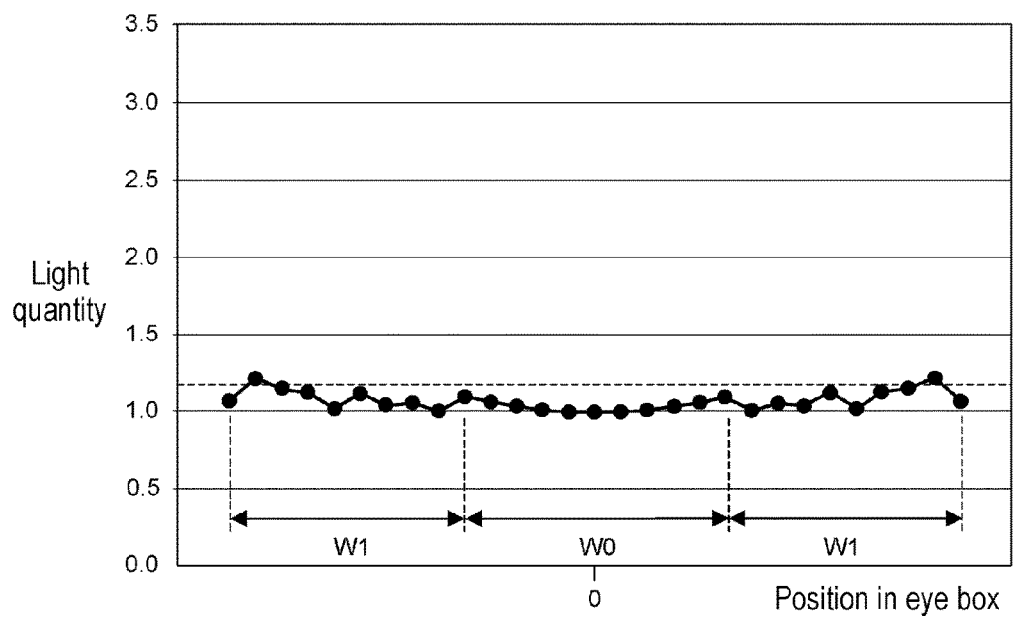
FIG. 8B is a graph showing a light quantity distribution in the eye box according to the exemplary embodiment.

FIG. 8A is a graph showing a light quantity distribution in an eye box according to Comparative Example 1, and FIG. 8B is a graph showing a light quantity distribution in the eye box according to the exemplary embodiment.

In Comparative Example 1, the divergence angle of first lens portions 108a is set constant in all the range of drawing region D10. In Comparative Example 1, the divergence angle of all first lens portions 108a is set to approximately 20 degrees in a similar way to predetermined range W0 in FIG. 7B. In Comparative Example 1, curvature radius Rx of first lens portions 108a is constant in all the range of drawing region D10.

FIG. 8A and FIG. 8B show light quantity distributions (simulation results) in the eye box in the case of using screen 108 according to Comparative Example 1 and screen 108 according to the exemplary embodiment, respectively. In screen 108 according to the exemplary embodiment, the divergence angle is adjusted as shown in FIG. 7B.

In the graphs of FIG. 8A and FIG. 8B, axes of abscissas represent positions in a lateral direction of the eye boxes, and axes of ordinates represent light quantities per unit time. In the axes of abscissas, intermediate positions in the lateral direction of the eye boxes are set to 0. Note that the lateral direction of each of the eye boxes corresponds to the X-axis direction of screen 108. The axes of ordinates are normalized with light quantities at the intermediate positions in the lateral direction of the eye boxes in the X-axis direction taken as 1. In FIG. 8B, for convenience, ranges corresponding to predetermined range W0 and ranges W1 on both sides, which are shown in FIG. 7B, are shown as W0 and W1, respectively.

As shown in FIG. 8A, in Comparative Example 1, the light quantity in the eye box is larger toward both ends of the eye box. This is because the scanning speed of the laser light by scanner 106 slows toward both ends of drawing region D10 in the X-axis direction. In Comparative Example 1, the light quantity in the eye box becomes larger toward both ends of the eye box as described above, and accordingly, the brightness of image 30 visually recognized by the observer becomes uneven.

As shown in FIG. 8B, in the exemplary embodiment, as described above, screen 108 is configured such that the divergence angle in the X-axis direction can become gradually larger toward the ends of screen 108 in ranges W1 on both sides, which exclude predetermined range W0 in the center of the scanning direction (X-axis direction). Therefore, the light quantities of the light of both side portions in the eye box are weakened toward the ends in comparison with the central portion. In this way, the brightness of the entire image in the eye box is brought close to an even state. As a result, in the exemplary embodiment, the brightness of the image visually recognized by the observer becomes substantially even in the entire region in the eye box.

Note that broken lines added to FIG. 8A and FIG. 8B indicate levels at which the light quantity is 1.2 times the light quantity at the intermediate position in the lateral direction of the eye box. In such a range where the light quantity is approximately 1.2 times, since luminance unevenness of the image is small, a change in brightness is hardly visually recognized by human eyes. Hence, in this range, the image can be displayed without causing the observer to feel uncomfortable even if the light quantity in the eye box is not particularly adjusted.

Predetermined range W0 corresponds to a range in the eye box, where the light quantity is 1.2 times or less the light quantity at the intermediate position in the lateral direction of the eye box. Specifically, predetermined range W0 is set in a range where, when the intensity of the laser light that scans screen 108 is constant, the light quantity of the laser light transmitted through screen 108 per unit time is 1.2 times or less the light quantity at the intermediate position of drawing region D10 in the scanning direction (X-axis direction). It is preferable that predetermined range W0 be set so as to satisfy this condition.

Note that, when predetermined range W0 is set in a range of 40% or more to 50% or less of the entire range of drawing region D10 in the scanning direction (X-axis direction), predetermined range W0 can substantially satisfy the above-mentioned condition. Hence, predetermined range W0 is set in the range of 40% or more to 50% or less of the entire range of drawing region D10 in the scanning direction (X-axis direction), whereby the observer can visually recognize the image, which is formed in predetermined range W0, without causing the observer to feel uncomfortable due to the luminance unevenness.

Figure 9A:
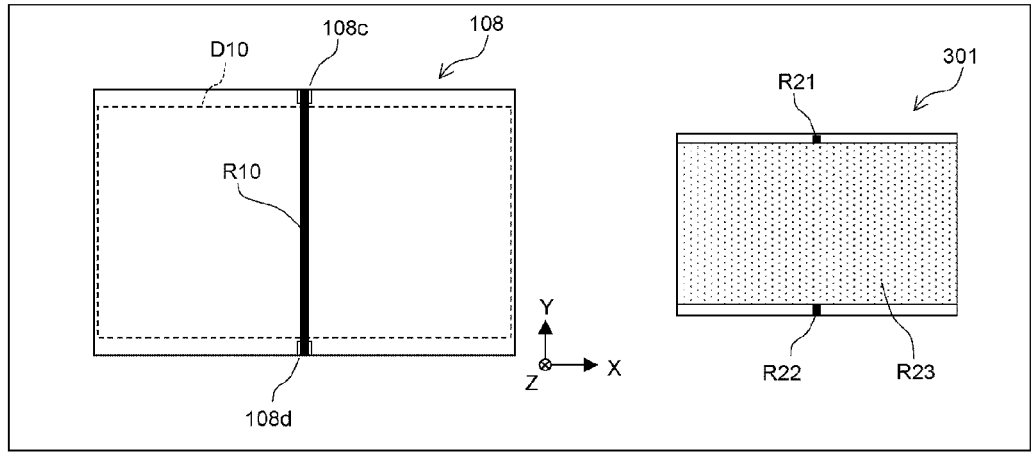
FIG. 9A is a diagram showing a position adjustment method for the screen according to the exemplary embodiment.
Figure 9B:
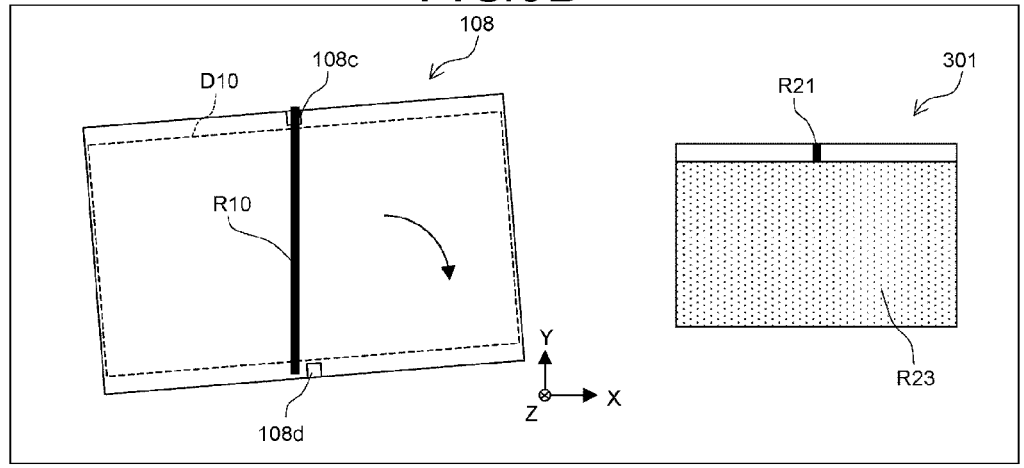
FIG. 9B is a diagram showing the position adjustment method for the screen according to the exemplary embodiment.
Figure 9C:
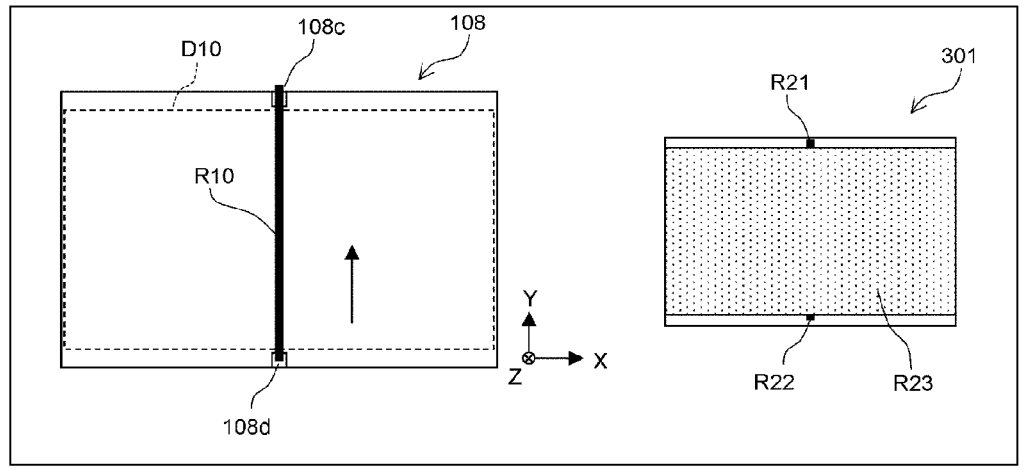
FIG. 9C is a diagram showing the position adjustment method for the screen according to the exemplary embodiment.

FIG. 9A to FIG. 9C are diagrams individually showing position adjustment methods for screen 108. Such position adjustment is performed by using a predetermined position adjustment device in a manufacturing process of image display device 20.

Each of FIG. 9A to FIG. 9C shows a state of screen 108 on a left side, and on a right side, shows a state of imaging element 301 in the position adjustment device. The position adjustment device includes: a mechanical unit for adjusting the position of screen 108 in a direction parallel to the X-Y plane; and imaging element 301 for receiving the light emitted from screen 108.

In a position adjustment process, image processing circuit 201 shown in FIG. 2 controls laser drive circuit 202 and mirror drive circuit 203 such that straight line image R10 extending in the Y-axis direction can be drawn on screen 108. A length in the Y-axis direction of straight line image 1110 is set longer than a length in the Y-axis direction of drawing region D10, and for example, is set to be substantially the same as a length in the Y-axis direction of screen 108. A width in the X-axis direction of straight line image R10 is set to be substantially the same as a width in the X-axis direction of non-lens regions 108c, 108d.

FIG. 9A shows a state in which screen 108 is positioned at a normal position on a plane parallel to the X-Y plane. In this case, an upper end portion and lower end portion of straight line image R10 are positioned in non-lens regions 108c, 108d, respectively, and pass through non-lens regions 108c, 108d, respectively without being diverged. In this way, light ray portions R21, R22, which are based on the upper end portion and lower end portion of straight line image R10, are projected on imaging element 301. A central portion of straight line image R10, which is other than the upper end portion and the lower end portion, is diffused in the X-axis direction by first lens portions 108a (refer to FIG. 3A) arranged in drawing region D 10. In this way, diffused light R23, which is based on the central portion of straight line image R10, is projected onto imaging element 301.

In this case, the position adjustment device detects that light ray portions R21 and R22 are projected by the same amount on imaging element 301, thereby determining that screen 108 is positioned at the normal position on the plane parallel to the X-Y plane.

FIG. 9B shows a state in which screen 108 is rotated in a counterclockwise direction from the normal position on the plane parallel to the X-Y plane. In this case, only the upper end of straight line image R10 is positioned in non-lens region 108c. Therefore, light ray portion R21 that is based on the upper end portion of straight line image R10 is projected on imaging element 301; however, light ray portion R22 that is based on the lower end portion of straight line image R10 is not projected on imaging element 301. Based on a fact that only light ray portion R21 between light ray portions R21, R22 is projected on imaging element 301, the position adjustment device rotates, in a clockwise direction, screen 108 as shown by an arrow in FIG. 8B around upper non-lens region 108c. In this way, as shown in FIG. 9C, the lower end portion of straight line image R10 is positioned in non-lens region 108d, and light ray portion R22 that is based on the lower end portion is projected on imaging element 301.

In this case, light ray portion R21 is projected on imaging element 301 more than light ray portion R22, and accordingly, the position adjustment device moves screen 108 in the positive direction of the Y-axis as shown by an arrow in FIG. 9C such that light ray portions R21, R22 can be projected by the same amount. In this way, straight line image 1110 is positioned with respect to screen 108 as shown in FIG. 8A. Light ray portions R21, R22 have the same projected amount on imaging element 301, whereby the position adjustment device determines that light ray portions R21, R22 are positioned at the normal positions on the plane parallel to the X-Y plane. After the position adjustment is performed in this manner, screen 108 is fixed in image display device 20 by fixing means such as an adhesive.

Note that, in the example of FIG. 9B, the upper end portion of straight line image R10 is positioned in non-lens region 108c; however, it is also possible that both of the upper end portion and lower end portion of straight line image R10 may not be positioned in non-lens regions 108c, 108 d, respectively. In this case, while referring to an image captured by imaging element 301, the position adjustment device rotates and moves screen 108 in a direction parallel to the X-Y plane by a predetermined adjustment step, and as shown in FIG. 9A, executes position adjustment for screen 108 such that the upper end portion and lower end portion of straight line image R10 can be equally positioned in non-lens regions 108c, 108d, respectively.

Incidentally, when the spot diameter of the laser light on screen 108 is set equal to or less than the width of each lens as described above, then as a method of causing the laser light to scan screen 108, for example, there can be used a method of causing the laser light to scan screen 108 such that beam B1 can pass through centers of lens regions La1 (refer to FIG. 4) arranged in one line in the scanning direction (X-axis direction) of the laser light.

Figure 10A:
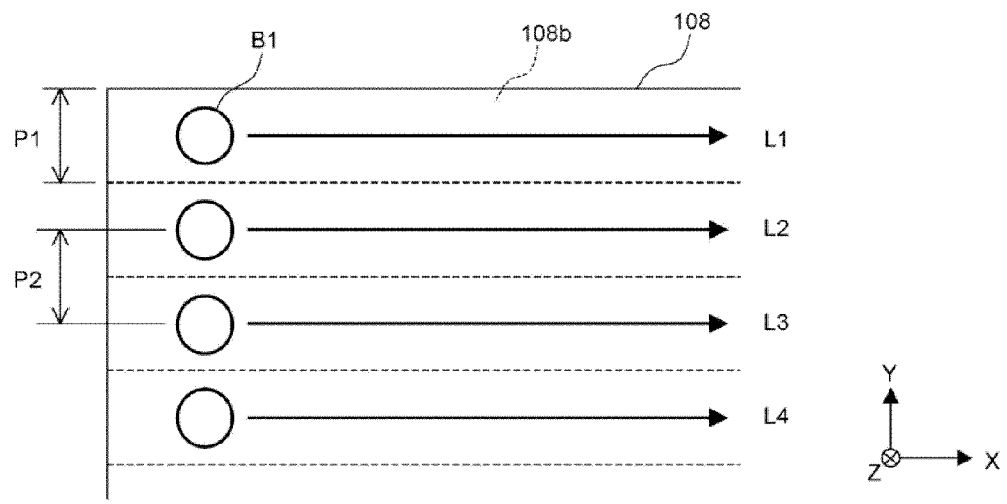
FIG. 10A is a diagram schematically showing a scanning method of laser light according to Comparative Example 2.

FIG. 10A is a diagram showing a scanning method (Comparative Example 2) in this case. For convenience, in FIG. 10A, illustration of first lens portions 108a formed on the incident surface side of screen 108 is omitted. Broken lines in FIG. 10A indicate the boundaries of second lens portions 108b formed on the emission surface side of screen 108.

In the scanning method of Comparative Example 2, scan lines L1 to Ln are set at central positions in the width direction (Y-axis direction) of second lens portions 108b. Hence, pitch P1 of second lens portions 108b and pitch P2 of scan lines L1 to Ln are equal to each other. Note that pitch P1 corresponds to a pitch in the Y-axis direction of lens regions La1 shown in FIG. 4.

However, it was confirmed by the inventors that, in this scanning method, interference fringes were generated on a display image when a positional relationship between such a scanning position of the laser light and screen 108 is shifted in a direction (Y-axis direction) perpendicular to the scanning direction.

Each of FIG. 10B to FIG. 10E is a view schematically showing the interference fringes generated in image 30 when the positional relationship between the scanning position of the laser light and second lens portions 108b is changed in the direction (Y-axis direction) perpendicular to the scanning direction in the scanning method according to Comparative Example 2.

Figure 10B:
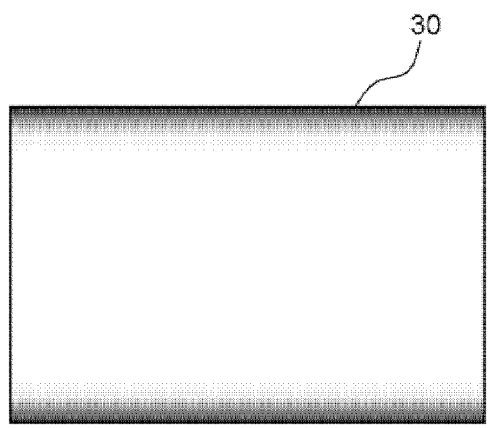
FIG. 10B is a view schematically showing interference fringes generated in a display image when a scanning position of the laser light is displaced in an alignment direction of a second lens portion in the scanning method according to Comparative Example 2.

FIG. 10B shows a state in a case where the scanning position of the laser light is positioned at the central positions of second lens portions 108b, that is, a case where the positional relationship between the scanning position of the laser light and screen 108 is appropriate. In this case, as shown in FIG. 10B, the interference fringes are not generated in image 30.

Figure 10C:
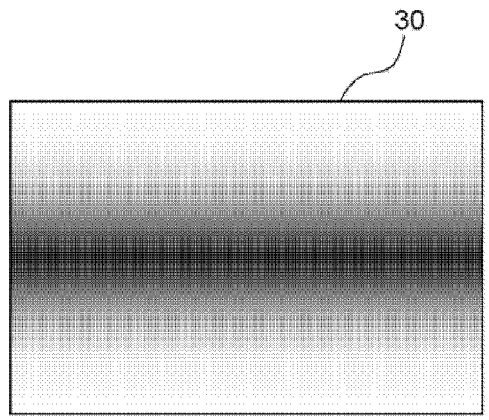
FIG. 10C is a view schematically showing the interference fringes generated in the display image when the scanning position of the laser light is displaced in the alignment direction of the second lens portion in the scanning method according to Comparative Example 2.
Figure 10D:
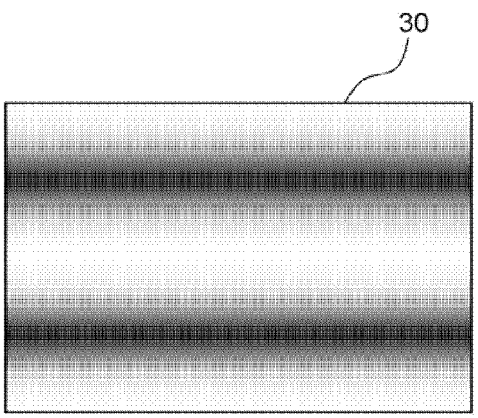
FIG. 10D is a view schematically showing the interference fringes generated in the display image when the scanning position of the laser light is displaced in the alignment direction of the second lens portion in the scanning method according to Comparative Example 2.
Figure 10E:
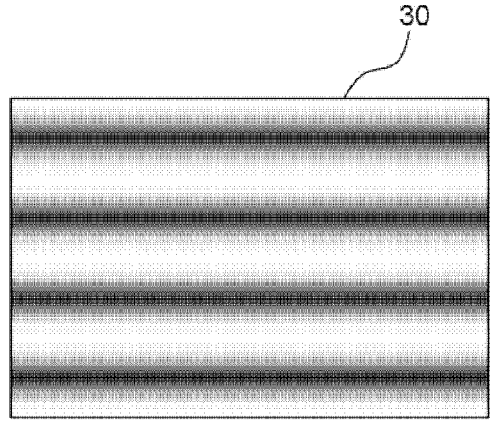
FIG. 10E is a view schematically showing the interference fringes generated in the display image when the scanning position of the laser light is displaced in the alignment direction of the second lens portion in the scanning method according to Comparative Example 2.

Each of FIG. 10C to 10E shows a state of interference fringes when the scanning position of the laser light is shifted in the Y-axis direction from the central positions of second lens portions 108b. In FIG. 10D, a shift amount of the scanning position is larger than in the case of FIG. 10C, and in FIG. 10E, a shift amount of the scanning position is larger than in the case of FIG. 10D.

As shown in FIG. 10C to FIG. 10E, in the scanning method of Comparative Example 2, when the scanning position of the laser light is shifted in the Y-axis direction from the central positions of second lens portions 108b, the interference fringes are generated in image 30, and a number of interference fringes increases as the shift amount becomes larger. As described above, in the scanning method of Comparative Example 2, the visibility of image 30 decreases due to the interference fringes generated in image 30.

In order to avoid such a problem, in the scanning method of Comparative Example 2, at the time of installing screen 108, it is required to strictly adjust an installation position of screen 108 such that the laser light can pass through the centers of second lens portions 108b. However, even when the position of screen 108 is appropriately adjusted at the time of such installation as described above, if screen 108 is deformed and so on due to a subsequent temperature change or the like, then there collapses the positional relationship between the scanning position of the laser light and the second lens portions 108b, and the interference fringes are generated in image 30. Therefore, in the scanning method of Comparative Example 2, it is extremely difficult to suppress the interference fringes and to maintain visibility of image 30 satisfactorily.

In order to solve such inconveniences, in this exemplary embodiment, in order to make the interference fringes, which are generated in image 30, inconspicuous, the method of causing the laser light to scan screen 108 is adjusted as follows.

Figure 11A:
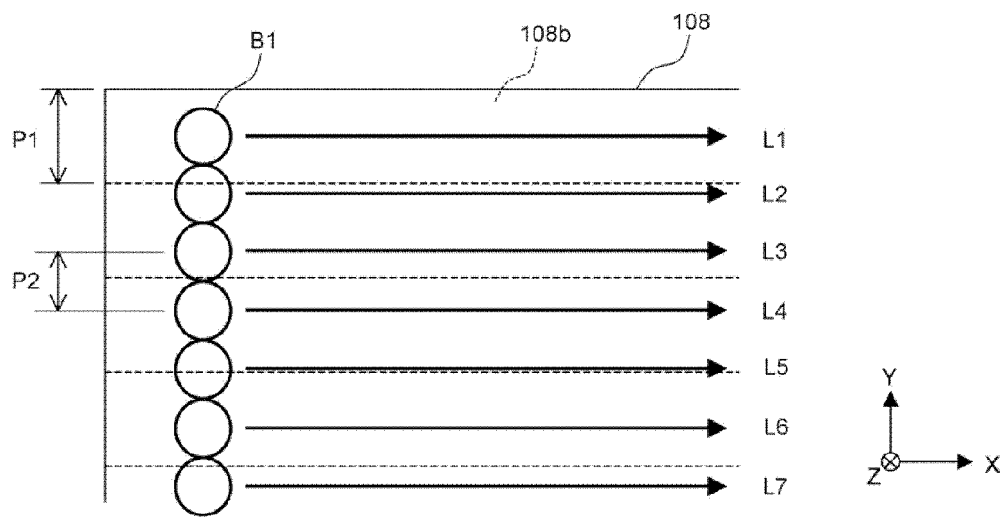
FIG. 11A is a diagram schematically showing a scanning method of the laser light according to the exemplary embodiment.

FIG. 11A is a diagram schematically showing the scanning method of the laser light according to the exemplary embodiment. For convenience, also in FIG. 11A, illustration of first lens portions 108a formed on the incident surface side of screen 108 is omitted. Broken lines in FIG. 11A indicate the boundaries of second lens portions 108b formed on the emission surface side of screen 108.

As shown in FIG. 11A, in the scanning method of this exemplary embodiment, pitch P2 of scan lines L1 to Ln is set smaller than pitch P1 of second lens portions 108b. Hence, in a predetermined scan line, the scanning position of the laser light is shifted in the Y-axis direction with respect to the central positions of second lens portions 108b. Moreover, in these scan lines, the shift amount of the scanning position of the laser light (beam B1) with respect to the central positions of second lens portions 108b differs for each of the scan lines. Furthermore, in a predetermined scan line, it is possible that the laser light (beam B1) may straddle two second lens portions 108b adjacent to each other.

In accordance with the scanning method of this exemplary embodiment, pitch P2 of scan lines L1 to Ln is adjusted as described above, whereby the interference fringes generated in image 30 can be made inconspicuous as shown by experimental results later.

Each of FIG. 11B to FIG. 11E is a view schematically showing the interference fringes generated in image 30 when the positional relationship between the scanning position of the laser light and second lens portions 108b is changed in the direction (Y-axis direction) perpendicular to the scanning direction in the scanning method according to the exemplary embodiment.

Figure 11B:
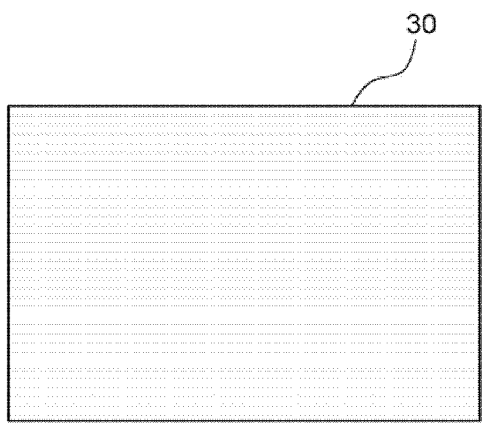
FIG. 11B is a view schematically showing interference fringes visually recognized in the display image when the scanning position of the laser light is displaced in the alignment direction of the second lens portion in the scanning method according to the exemplary embodiment.
Figure 11C:
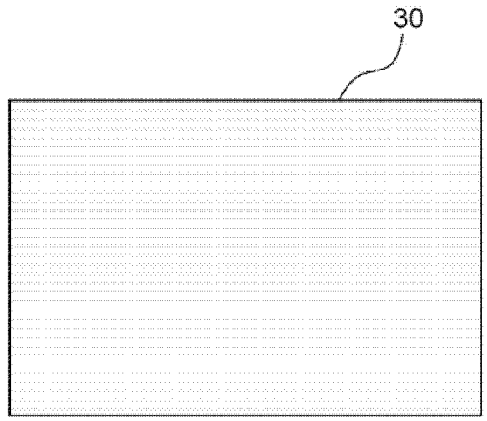
FIG. 11C is a view schematically showing the interference fringes visually recognized in the display image when the scanning position of the laser light is displaced in the alignment direction of the second lens portion in the scanning method according to the exemplary embodiment.
Figure 11D:
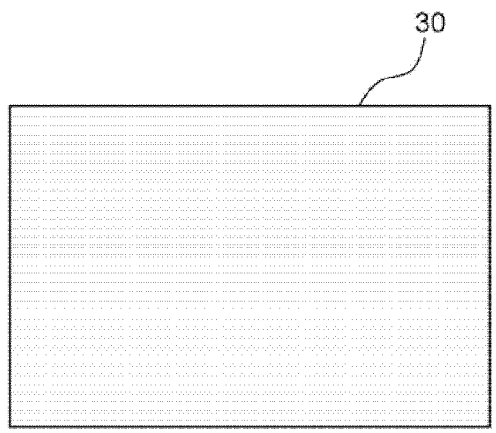
FIG. 11D is a view schematically showing the interference fringes visually recognized in the display image when the scanning position of the laser light is displaced in the alignment direction of the second lens portion in the scanning method according to the exemplary embodiment.
Figure 11E:
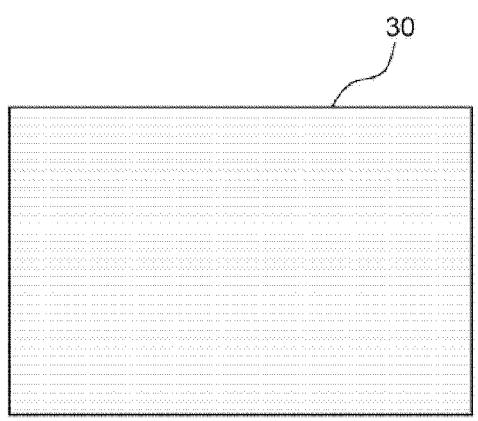
FIG. 11E is a view schematically showing the interference fringes visually recognized in the display image when the scanning position of the laser light is displaced in the alignment direction of the second lens portion in the scanning method according to the exemplary embodiment.
Figure 12A:
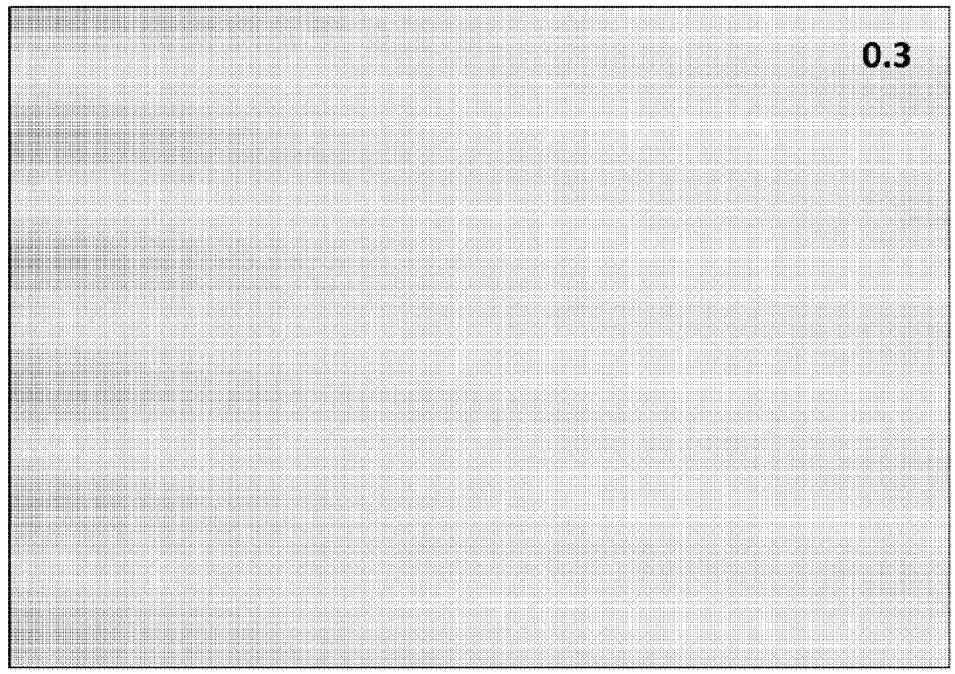
FIG. 12A is a view showing a captured image obtained by capturing interference fringes generated in a display image when a ratio of a pitch of scan lines to a pitch of the second lens portion is changed in an experiment according to the exemplary embodiment.
Figure 12B:
FIG. 12B is a view showing the captured image obtained by capturing the interference fringes generated in the display image when the ratio of the pitch of the scan lines to the pitch of the second lens portion is changed in the experiment according to the exemplary embodiment.

FIG. 11B shows a state of the interference fringes when the positional relationship between the scanning position of the laser light and screen 108 is appropriate. Moreover, each of FIG. 11C to FIG. 11E show a state of the interference fringes when the scanning position of the laser light shifts in the Y-axis direction relative to screen 108. In FIG. 11D, the shift amount of the scanning position is larger than in the case of FIG. 11C, and in FIG. 11E, the shift amount of the scanning position is larger than in the case of FIG. 11D.

As shown in FIG. 11B, in the scanning method of the exemplary embodiment, the interference fringes may be generated in image 30 even when the positional relationship between the scanning position of the laser light and screen 108 is appropriate. However, the interference fringes generated here are fine and have a small difference in contrast, and accordingly, become extremely inconspicuous in image 30. In particular, when a background color of image 30 is black, the interference fringes cannot be substantially visually recognized.

Moreover, as shown in FIG. 11C to FIG. 11E, in the scanning method of the exemplary embodiment, interference fringes similar to those in the case of FIG. 11B are generated even when the scanning position of the laser light is shifted in the Y-axis direction from the normal position. Note that, here, the interference fringes move in a vertical direction in response to the shift amount of the scanning position of the laser light. However, also in these cases, as in the case of FIG. 11B, the interference fringes generated in image 30 are fine and have a small difference in contrast, and accordingly, become extremely inconspicuous in image 30.

As described above, in accordance with the scanning method of this exemplary embodiment, the interference fringes generated in image 30 are fine and have such a small difference in contrast, and accordingly, can be made extremely inconspicuous in image 30. Hence, the visibility of image 30 can be maintained satisfactorily. Moreover, even if the scanning position of the laser light is shifted in the Y-axis direction from the normal position, such a manner of generation of the interference fringes does not substantially change. Therefore, the visibility of image 30 can be satisfactorily maintained even if screen 108 is deformed and so on due to a temperature change or the like, and the scanning position of the laser light on screen 108 shifts relatively in the Y-axis direction.

Experiment

By experiment, the inventors confirmed the interference fringes generated in image 30 when a ratio of pitch P2 of the scan lines to pitch P1 (the pitch in the direction perpendicular to the scanning direction of lens region La1 shown in FIG. 4) of second lens portions 108b is changed.

In the experiment, in a similar way to the exemplary embodiment described above, screen 108 was used, in which first lens portions 108a and second lens portions 108b were formed on an incident surface and an emission surface, respectively. Note that, with regard to second lens portions 108b, the divergence angle shown in FIG. 7B was not adjusted, and the divergence angle of all second lens portions 108b were made constant.

Conditions of the experiment were set as follows.
Width of first lens portions 108a . . . 50 μm
Width of second lens portions 108b . . . 50 μm Divergence angle of laser light by first lens portions 108a . . . ±22 degrees Divergence angle of laser light by second lens portions 108b . . . ±10 degrees Distance between first lens portions 108a and second lens portions 108b . . . 0.3 mm Beam diameter on incident surface of screen 108 (in case of a full width at half maximum (FWHM)) . . . 45 μm Among the above-described conditions, with regard to the divergence angle of the laser light, directions away from each other with an optical axis of the laser light taken as a center were individually indicated to be positive and negative. Moreover, as screen 108, one was used, in which first lens portions 108a and second lens portions 108b were formed on front and rear surfaces of a sheet having a thickness of 0.3 mm, respectively. Hence, a distance between first lens portions 108a and second lens portions 108b was 0.3 mm.

In the experiment, white plain image 30 was displayed on image display device 20 having a similar optical system to in the above-described exemplary embodiment, and image 30 was captured at the position of the eye box.

Each of FIG. 12A to FIG. 14B is a picture of an image captured in this experiment. To an upper right corner of each picture, there is added the ratio (P2/P1) of pitch P2 of the scan lines to pitch P1 of second lens portions 108b.

Referring to FIG. 12A to FIG. 14B, it is understood that, in accordance with the scanning method of the exemplary embodiment, the difference in contrast of the interference fringes generated in image 30 is small, and the interference fringes are less likely to be conspicuous. In particular, referring to FIG. 13A to FIG. 14A, it is understood that, in a range where the ratio of pitch P2 of the scan lines to pitch P1 of second lens portions 108b is 0.5 to 0.7, the interference fringes generated in image 30 are fine and have a small difference in contrast, and accordingly, the interference fringes become extremely less likely to be conspicuous in image 30. In particular, it is understood that, when the ratio of pitch P2 of the scan lines to pitch P1 of second lens portions 108b is 0.6, the interference fringe can be hardly visually recognized in image 30 as shown in FIG. 13B.

From the above results of the experiment, it was able to be confirmed that the interference fringes generated in image 30 can be made inconspicuous in such a manner that pitch P2 of the scan lines is set smaller than pitch P1 (the pitch in the direction perpendicular to the scanning direction of lens region La1 shown in FIG. 4) of second lens portions 108b. In particular, the ratio of pitch P2 of the scan lines to pitch P1 of second lens portions 108b is set in the range of 0.5 to 0.7, whereby the interference fringes generated in image 30 can be made inconspicuous, and in particular, it was able to be confirmed that the interference fringes can be hardly visually recognized in image 30 in such a manner that the ratio of pitch P2 of the scan lines to pitch P1 of second lens portions 108b is set to approximately 0.6. From this fact, it can be said that, preferably, the ratio of pitch P2 of the scan lines to pitch P1 of second lens portions 108b is set in the range of 0.5 to 0.7, and particularly preferably, this ratio is set to approximately 0.6.

Note that, in the above-described experiment, the inventors visually checked a state of the interference fringes while shifting the scanning position of the laser light on screen 108 in the direction perpendicular to the scanning direction. As a result, even if the scanning position of the laser light on screen 108 is shifted as described above at each of the ratios of pitch P2 to pitch P1, the interference fringes move only in the vertical direction, and a pattern itself of the interference fringes did not substantially change. From this fact, it was able to be confirmed that deterioration of image 30 due to the interference fringes can be suppressed to satisfactorily maintain the visibility of image 30 even if screen 108 is deformed and so on due to the temperature change or the like, and the scanning position of the laser light on screen 108 thereby shifts relatively in the direction (Y-axis direction) perpendicular to the scanning direction.

Note that, in the scanning method of the exemplary embodiment, it is conceived that a reason why the interference fringes are fine and have such a small contrast difference as described above is as follows.

Figure 15A:
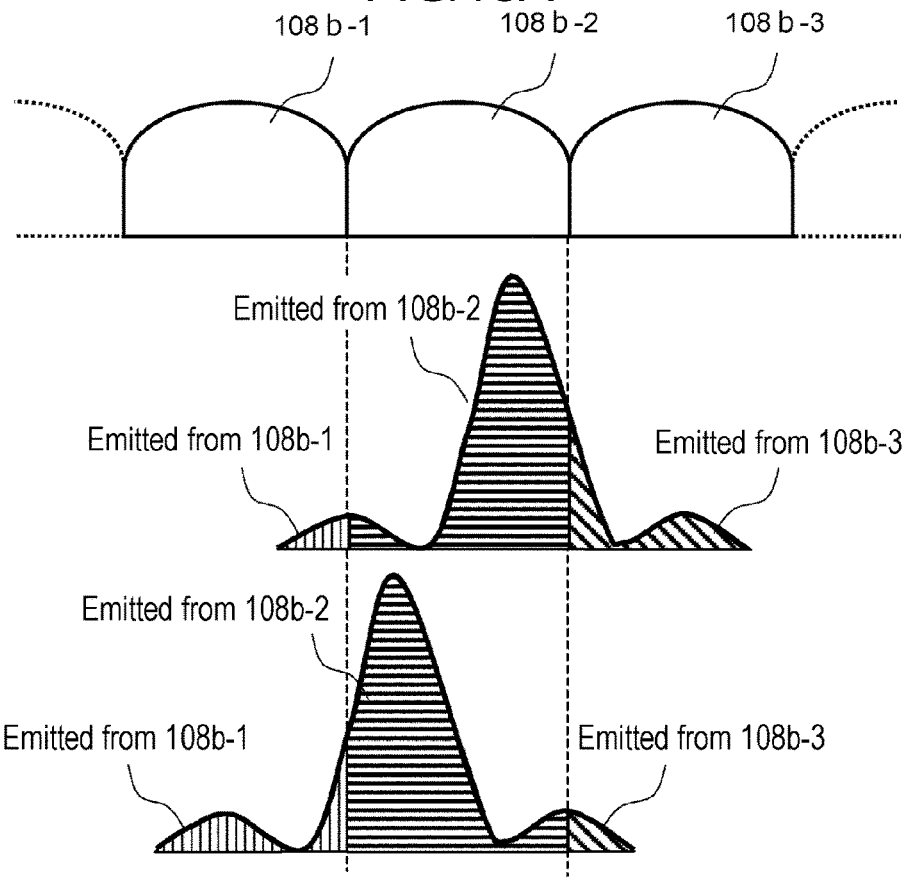
FIG. 15A is a diagram showing a relationship between the second lens portion and an intensity distribution of a laser beam in the scanning method of the exemplary embodiment.
Figure 15B:
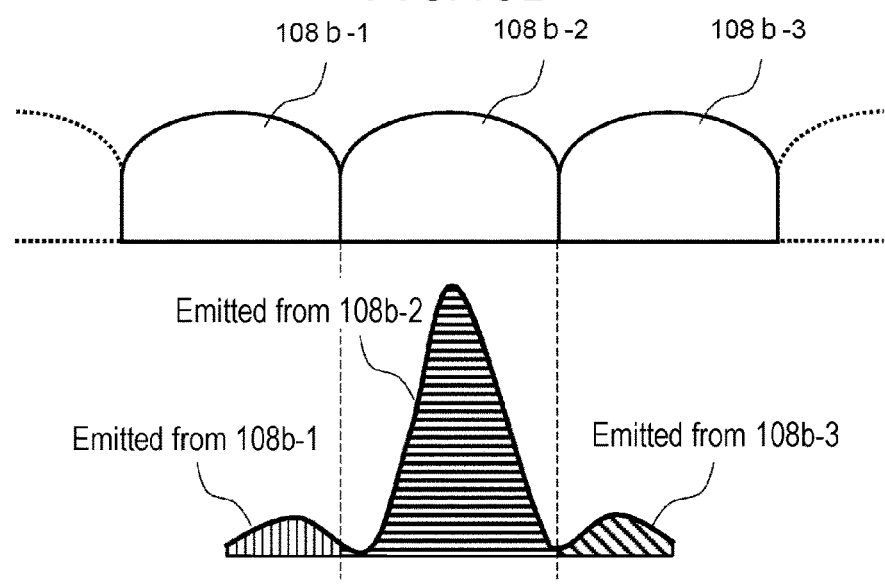
FIG. 15B is a diagram showing a relationship between the second lens portion and an intensity distribution of a laser beam in the scanning method of Comparative Example 2.

FIG. 15A shows the scanning method of the exemplary embodiment, and FIG. 15B shows the scanning method of Comparative Example 2. Each of FIG. 15A and FIG. 15B shows a relationship between second lens portion 108b and an intensity distribution of the laser beam. On a lower stage of FIG. 15A, the intensity distribution when the laser beam scans two scanning lines set in second lens portion 108b-2 is shown.

As shown in FIG. 15A, in the exemplary embodiment, pitch P2 of the scan lines is set smaller than pitch P1 of second lens portions 108b. Therefore, beam B1 straddles two or three second lens portions 108b (108b-1, 108b-2, 108b-3), and light is emitted from three second lens portions 108b with intensity distributions different from one another. One laser beam passes through such a plurality of second lens portions 108b and is emitted, whereby the same effect as when light in the same phase is output from a plurality of apertures is produced, and the interference fringes are generated in image 30.

In the exemplary embodiment, one second lens portion 108b is scanned by the plurality of scan lines, whereby the intensity of the light that passes through three second lens portions 108b differs for each line, and accordingly, such patterns of the generated interference fringes differ from one another. Hence, during a period while the entire range of screen 108 is being scanned, several types of the interference fringes having patterns different from one another are generated. At this time, since a scanning frequency for screen 108 is high as described above, these several types of the interference fringes are visually recognized in a superimposed manner in a short time. Therefore, these several types of the interference fringes are visually averaged (electrically averaged in the case of imaging), the interference fringes visually recognized as the entire image become thin, and become inconspicuous as a whole. In the scanning method of Comparative Example 2, since only one scan line is set for one second lens portion 108b, several types of the interference fringes having patterns different from one another are not generated or the generated interference fringes are not visually averaged as in the scanning method of the exemplary embodiment.

Hence, if the diameter of beam B1 is set smaller than the width in the Y-axis direction of lens region La1 (that is, the width of second lens portions 108b) and if pitch P2 is set smaller than pitch P1 regardless of the conditions of the above-described experiment, then it is assumed that the same effect as that in the above-described experiment can be exerted even if the size of lens region La1 or the like is different from those of the above-described conditions.

Effects of Exemplary Embodiment

As described above, in accordance with this exemplary embodiment, the following effects are exerted.

As shown in FIG. 11A, pitch P2 of the scan lines is set smaller than pitch P1 (the pitch in the direction perpendicular to the scanning direction of lens region La1 shown in FIG. 4) of second lens portions 108b, and accordingly, as verified in the above-described experiment, the interference fringes generated in image 30 can be made inconspicuous. Moreover, pitch P2 is set as described above, whereby the interference fringes generated in image 30 can be maintained in such an inconspicuous state even if screen 108 is deformed and so on due to the temperature change or the like and the scanning position of the laser light on screen 108 changes relatively in the Y-axis direction. Hence, the visibility of image 30 can be maintained satisfactorily.

Note that, as verified in the above-described experiment, preferably, the ratio (P2/P1) of pitch P2 of the scan lines to pitch P1 (the pitch in the direction perpendicular to the scanning direction of lens region La1) of second lens portions 108b is set in the range of 0.5 or more to 0.7 or less. In this way, as shown in FIG. 13A to FIG. 14A, the interference fringes can be remarkably inconspicuous.

Figure 13A:
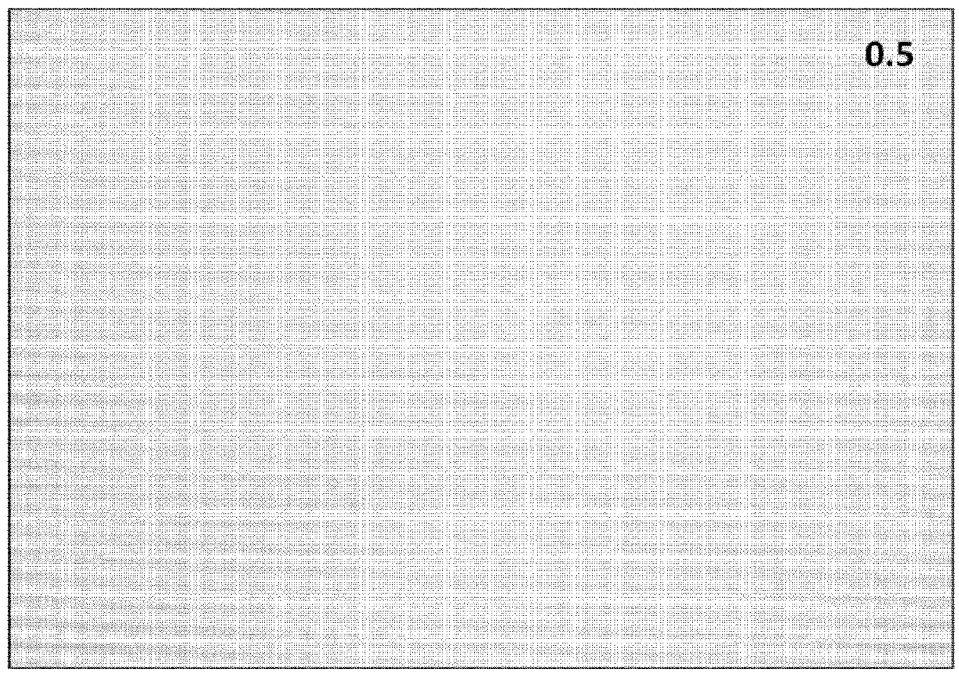
FIG. 13A is a view showing the captured image obtained by capturing the interference fringes generated in the display image when the ratio of the pitch of the scan lines to the pitch of the second lens portion is changed in the experiment according to the exemplary embodiment.
Figure 13B:
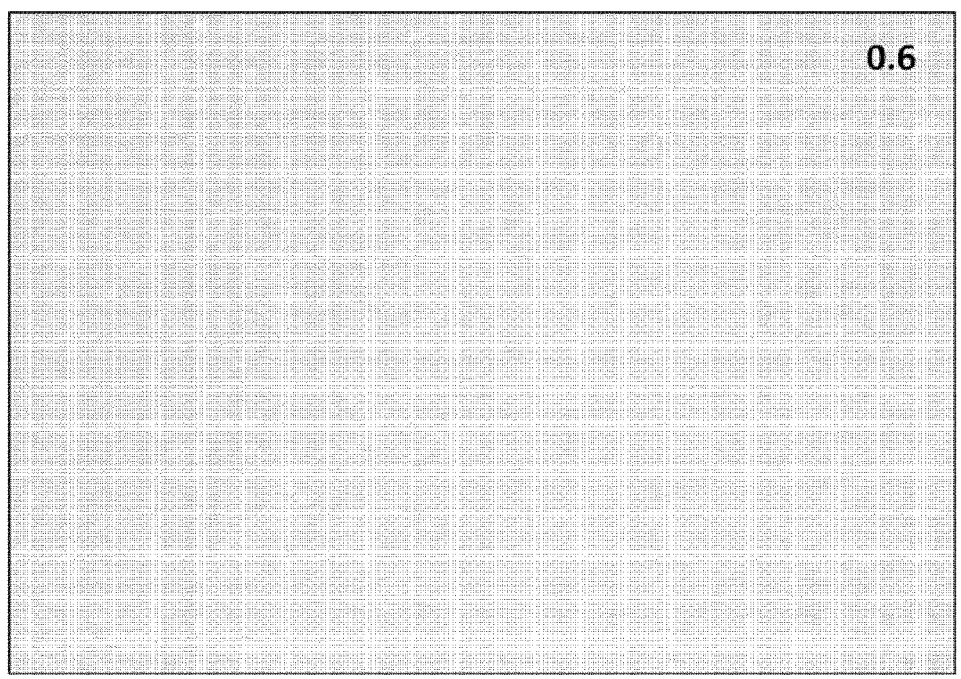
FIG. 13B is a view showing the captured image obtained by capturing the interference fringes generated in the display image when the ratio of the pitch of the scan lines to the pitch of the second lens portion is changed in the experiment according to the exemplary embodiment.
Figure 14A:
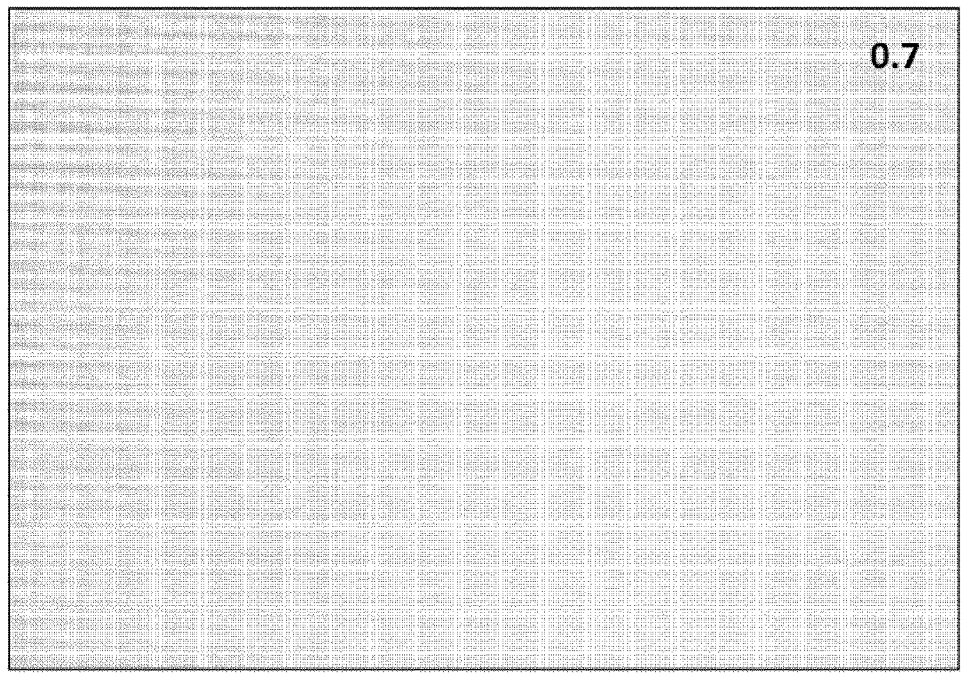
FIG. 14A is a view showing the captured image obtained by capturing the interference fringes generated in the display image when the ratio of the pitch of the scan lines to the pitch of the second lens portion is changed in the experiment according to the exemplary embodiment.
Figure 14B:
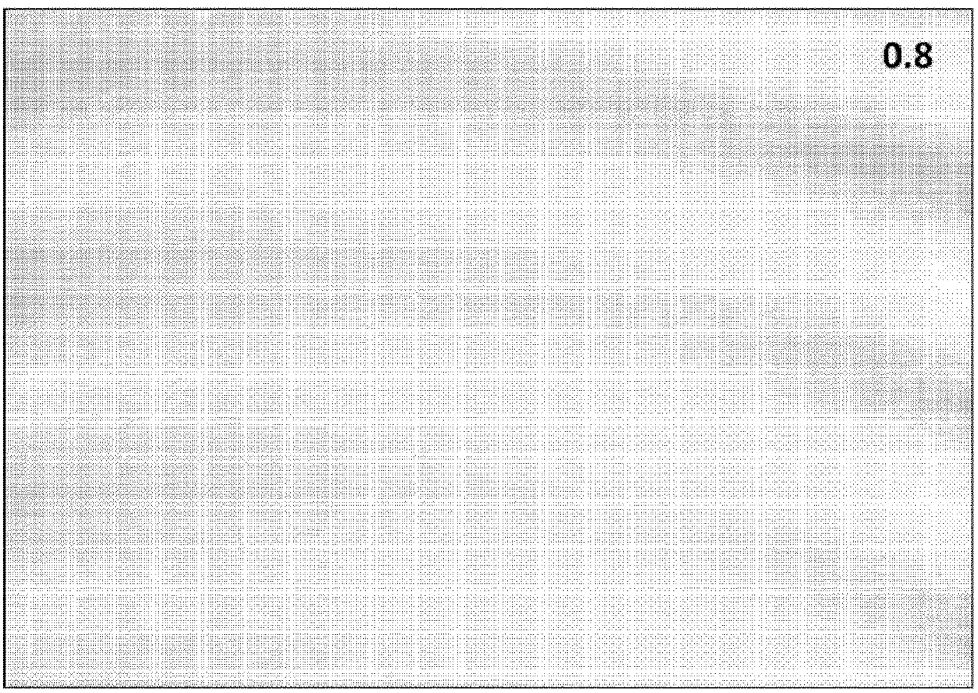
FIG. 14B is a view showing the captured image obtained by capturing the interference fringes generated in the display image when the ratio of the pitch of the scan lines to the pitch of the second lens portion is changed in the experiment according to the exemplary embodiment.

In particular, preferably, the ratio (P2/P1) of pitch P2 of the scan lines to pitch P1 (the pitch in the direction perpendicular to the scanning direction of lens region La1) of second lens portions 108b is set to approximately 0.6. In this way, as shown in FIG. 13B, the interference fringes can be hardly visually recognized.

As shown in FIG. 2, between light source 101 and screen 108, there are disposed mirror 104 and two dichroic mirrors 105a, 105b (optical axis aligners) for aligning the optical axes of the pieces of the laser light, which are individually emitted from three laser light sources 101a to 101c. In this way, color breakup can be suppressed from occurring in the interference fringes. That is, when the optical axes of the pieces of the laser light of the respective wavelengths are shifted from one another, the scanning positions of pieces of the laser light of the respective wavelengths on screen 108 are shifted, and the interference fringes which are based on the pieces of the laser light of the respective wavelengths are shifted. In this way, linear regions of colors based on the respective wavelengths appear separately from one another at edge portions of the interference fringes. In contrast, in this exemplary embodiment, the pieces of the laser light of the respective wavelengths are guided to screen 108 in a state in which the optical axes of the pieces of the laser light of the respective wavelengths are aligned with one another, and accordingly, the interference fringes based on the pieces of the laser light of the respective wavelengths are not shifted. Hence, there can be suppressed the generation of the linear regions of the colors of the respective wavelengths at the edge portions of the interference fringes, that is, the color breakup of the interference fringes.

As shown in FIG. 2, between light source 101 and screen 108, there are disposed collimator lenses 102a to 102c and apertures 103a to 103c (beam shaper) for aligning the beam sizes and beam shapes of the pieces of the laser light, which are individually emitted from laser light sources 101a to 101c. In this way, beams B1 of other wavelengths are suppressed from largely protruding around beam B1 of a predetermined wavelength. Hence, the interference fringes based on the pieces of the laser light of the respective wavelengths can be brought into substantially the same state, and the color breakup can be suppressed from occurring in the interference fringes.

Note that, among laser light sources 101a to 101c, laser light source 101a that emits the laser light of the red wavelength has a larger radiation angle of the laser light than other two laser light sources 101b, 101c, and accordingly, it is possible that the beam size of the laser light of the red wavelength after transmission through aperture 103a may become somewhat larger than those of the laser light of the blue wavelength and the laser light of the green wavelength. However, also in this case, the optical axes of the pieces of the laser light of the respective wavelengths are aligned with one another as described above, whereby the color breakup can be suppressed from occurring in the interference fringes.

Besides, when screen 108 includes the configurations of FIG. 3A and FIG. 3B, and FIG. 5A to FIG. 7B, the following effects can be obtained.

Screen 108 is configured such that the divergence angle in the X-axis direction can become gradually larger toward the ends of screen 108 in ranges W1 on both sides, which exclude predetermined range W0 in the center of the scanning direction (X-axis direction), in drawing region D10 on which the image is drawn, and accordingly, the light quantities of the light of both side portions in the eye box are weakened toward the ends in comparison with the central portion. Therefore, the brightness of the entire image in the eye box can be made nearly even. Moreover, since the divergence angle of screen 108 is constant in the predetermined range W0 in the center of the scanning direction (X-axis direction), it is unnecessary to precisely adjust the divergence angle in the entire range in the scanning direction. Hence, screen 108 can be easily constituted.

Moreover, predetermined range W0 is set in the range of 40% or more to 50% or less of the entire range of drawing region D10 in the scanning direction (X-axis direction). Alternatively, predetermined range W0 is set in the range where, when the intensity of the laser light that scans screen 108 is constant, the light quantity of the laser light transmitted through screen 108 per unit time is 1.2 times or less the light quantity at the intermediate position of drawing region D10 in the scanning direction (X-axis direction). Predetermined range W0 is set as described above, whereby, in particular, even if the divergence angle in the X-axis direction is not adjusted in predetermined range W0, the observer can be caused to visually recognize the image without causing the observer to feel uncomfortable due to the luminance unevenness.

Moreover, in this exemplary embodiment, since first lens portions 108a and second lens portions 108b are disposed on the incident surface and emission surface of screen 108, respectively, the divergence angle just needs to be adjusted only for first lens portions 108a on the incident surface side. Hence, the adjustment of the divergence angle for screen 108 can be carried out with ease.

Furthermore, in this exemplary embodiment, non-lens regions 108c and 108d of the predetermined size, which pass the incident light therethrough without diverging the same, are disposed at the positions above and below drawing region D10, respectively. In this way, as described with reference to FIG. 9A to FIG. 9C, screen 108 can be positioned at a predetermined position on the plane parallel to the X-Y plane by a simple operation.

Modification Example 1

Although the exemplary embodiment of the present disclosure has been described above, the present disclosure is not limited to the exemplary embodiment described above, and moreover, a variety of modifications can be applied to application examples of inventions according to the present disclosure besides the exemplary embodiment described above.

For example, in the above-described exemplary embodiment, first lens portions 108a and second lens portions 108b are disposed on the incident surface and emission surface of screen 108, respectively; however, screen 108 may have a configuration in which a lens group for diverging the laser light in the X-axis direction and the Y-axis direction is disposed on either one of the incident surface and emission surface of screen 108.

Figure 16A:
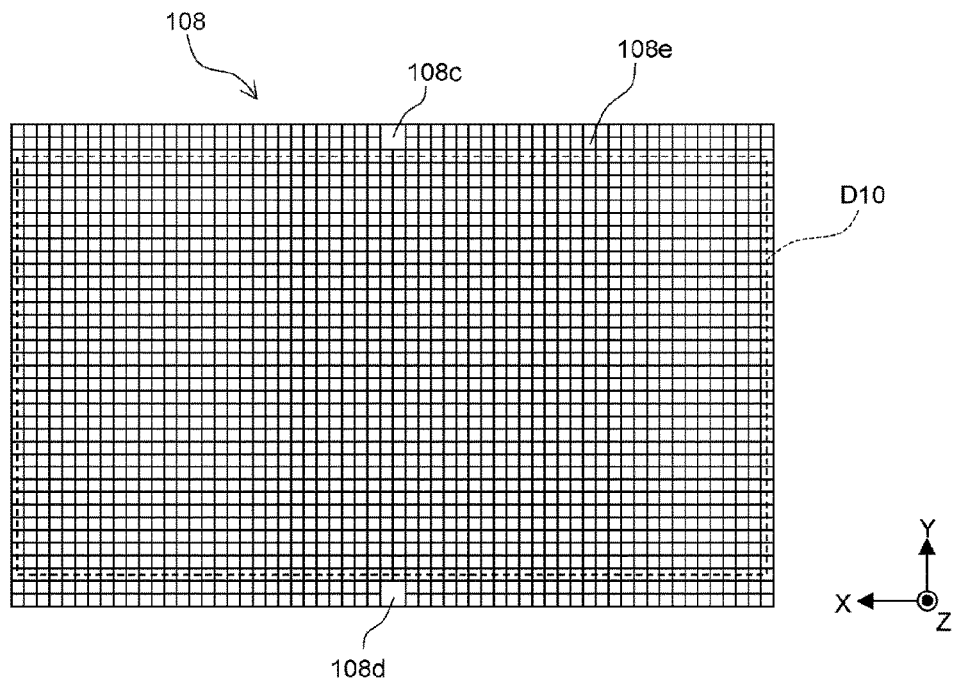
FIG. 16A is a diagram schematically showing a state of a screen according to Modification Example 1 as seen from the incident side of the laser light.
Figure 16B:
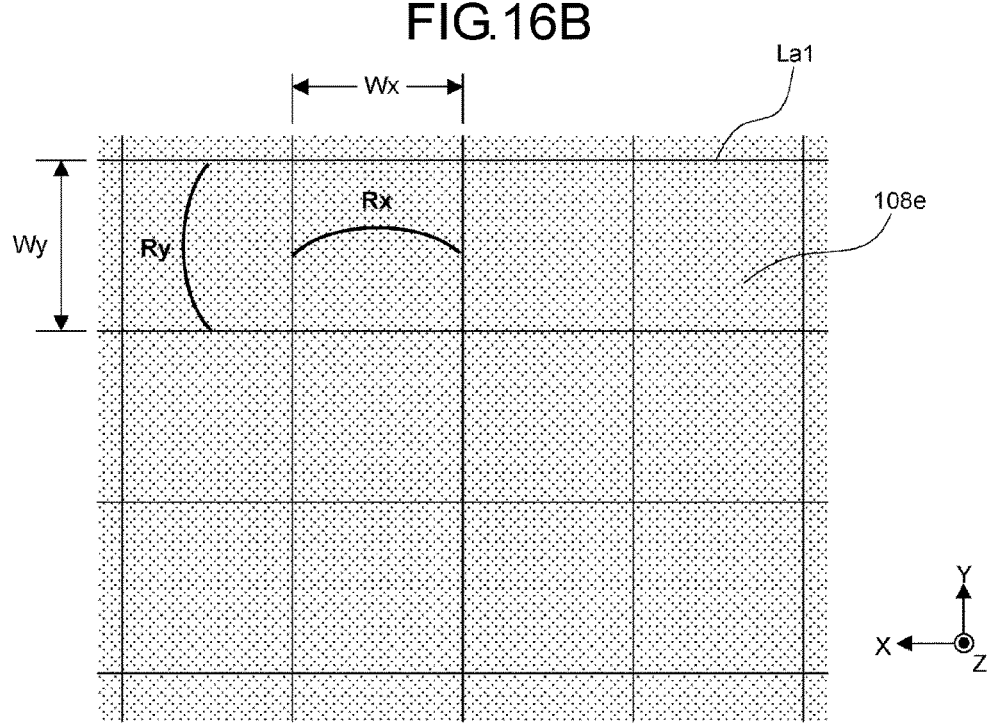
FIG. 16B is a partially enlarged view of the screen according to Modification Example 1.

FIG. 16A is a diagram showing a configuration example where, on the incident surface of screen 108, there are arranged a plurality of lens portions 108e (microlens array) for diverging the laser light in the scanning direction (X-axis direction) and in the direction (Y-axis direction) perpendicular to the scanning direction. FIG. 16B is an enlarged view of a partial region of FIG. 16A as seen from the positive side on the Z-axis.

Note that, in this configuration, one lens portion 108e corresponds to one lens region La1 shown in FIG. 4.

As shown in FIG. 16A and FIG. 16B, rectangular lens portions 108e are formed on the incident surface of screen 108 so as, as seen from above, to be arranged by a predetermined number in a lateral direction parallel to the X-axis and by a predetermined number in a longitudinal direction parallel to the Y-axis. Lateral widths Wx of respective lens portions 108e are equal to one another, and longitudinal widths Wy of respective lens portion 108e are also equal to one another. Both of such width Wx and such width Wy are approximately 50 μm. In the example of FIG. 16B, width Wx and width Wy are set equal to each other; however, width Wx and width Wy may be different from each other.

In each of lens portions 108e, curvature radius Rx in the X-axis direction and curvature radius Ry in the Y-axis direction are different from each other. Here, curvature radius Rx is set smaller than curvature radius Ry. Hence, a curvature of lens portions 108e in the X-axis direction is larger than a curvature of lens portions 108e in the Y-axis direction. The curvatures of lens portions 108e are set as described above, whereby, in a similar way to the exemplary embodiment described above, the laser light transmitted through respective lens portions 108e can be efficiently guided to the oblong region (eye box region) around the position of eye 2a of driver 2. The curvatures of lens portions 108e are determined in response to the shape of the eye box region.

In this modification example, setting can be made such that curvature radius Rx of each lens portion 108e can be constant in predetermined range W0 shown in FIG. 7A, and such that curvature radius Rx of each lens portion 108e can become smaller toward both ends in the positive and negative sides on the X-axis in ranges W1 on both sides, which are shown in FIG. 7A. In this way, the distribution of the divergence angle in the X-axis direction shown in FIG. 7B is realized Note that curvature radius Ry of each lens portion 108e is the same in all lens portions 108e. A relationship between curvature radius Rx and curvature radius Ry in predetermined range W0 is set to, for example, Rx:Ry=1:2.

Curvature radii Rx, Ry of lens portions 108e are set as described above, whereby, also in this modified example, the light quantity distribution shown in FIG. 7B can be realized. In this way, the brightness of the entire image in the eye box can be made nearly even.

Note that, also in this modification example, non-lens regions 108c, 108d are formed at the positions above and below drawing region D10, respectively. In this way, screen 108 can be positioned at a predetermined position on the plane parallel to the X-Y plane by the simple operation described with reference to FIG. 9A to FIG. 9C.

Moreover, in a similar way to the lens used in the above-described experiment, such curvature radii Rx of all lens portions 108e may be set to be the same, and the divergence angles in all lens portions 108e in the X-axis direction may be the same.

Note that the inventors visually confirmed whether or not the state of the interference fringes generated in image 30 is different between the case of scanning screen 108 according to Modification Example 1 by the scanning method of the above-described exemplary embodiment and the case of scanning screen 108 of the above-described exemplary embodiment by the scanning method of the above-described exemplary embodiment. As a result, in a similar way to the case of using screen 108 of the above-described exemplary embodiment, the effect that the interference fringes can be made inconspicuous in image 30 was able to be confirmed also when screen 108 of Modification Example 1 was used.

However, in comparison with the case where screen 108 of Modification Example 1 was used, when screen 108 of the above-described exemplary embodiment was used, the color breakup of the interference fringes was suppressed. A reason for the above is conceived as follows. In screen 108 of the above-described exemplary embodiment, first lens portions 108a and second lens portion 108b are spaced apart from each other in the optical axis direction, and accordingly, due to such a spaced distance, a slight shift (parallax) is generated between a focal position near the eye box of the laser light diverged by first lens portions 108a and a focal position near the eye box of the laser light diverged by second lens portions 108b.

Hence, in order to suppress the color breakup of the interference fringes and make the interference fringes less conspicuous, it can be said that it is preferable to use screen 108 as in the above-described exemplary embodiment, which includes: the plurality of first lens portions 108a which are formed on the incident surface of the laser light and diverge the laser light only in the X-axis direction (first direction); and the plurality of second lens portions 108b which are formed on the emission surface of the laser light and diverge the laser light only in the direction perpendicular to the Y-axis direction (second direction).

Note that, in the above-described exemplary embodiment, first lens portions 108a are formed on the incident surface of screen 108, and second lens portions 108b are formed on the emission surface of screen 108; however, the plurality of second lens portions 108b, which diverge the laser light in the Y-axis direction (second direction) may be formed on the incident surface of screen 108, and the plurality of first lens portions 108a which diverge the laser light in the X-axis direction (first direction) may be formed on the emission surface of screen 108.

Modification Example 2

In the above-described exemplary embodiment, the position of screen 108 is fixed; however, in the image display operation, screen 108 may be moved in the Z-axis direction.

Figure 17:
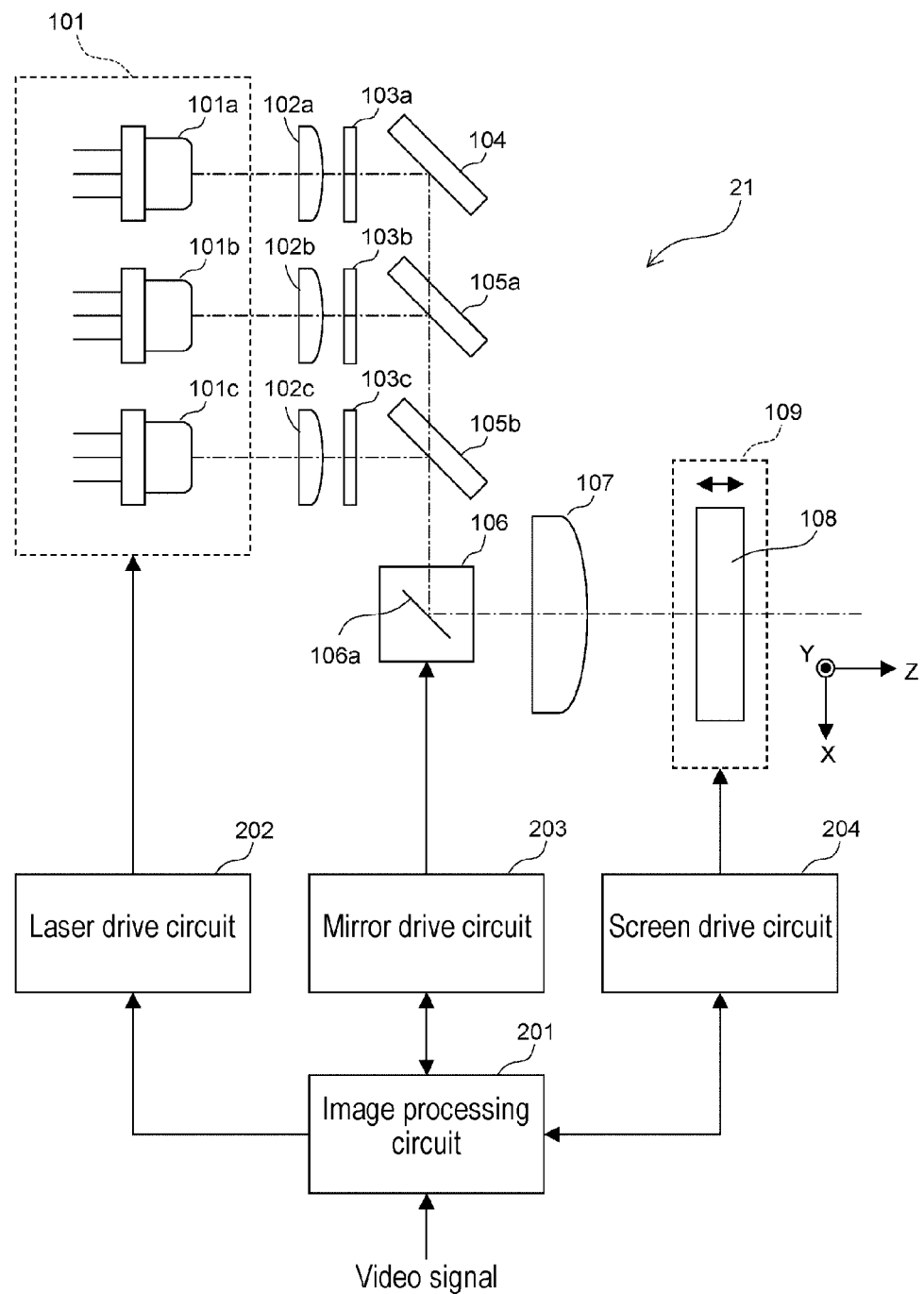
FIG. 17 is a diagram showing configurations of an irradiation light generator of an image display device according to Modification Example 2 and of a circuit for use in the irradiation light generator.

FIG. 17 is a diagram showing configurations of irradiation light generator 21 of image display device 20 according to Modification Example 2 and of a circuit for use in irradiation light generator 21.

As shown in FIG. 17, in this modification example, drive unit 109 and screen drive circuit 204 are added in comparison with the configuration in FIG. 2. Drive unit 109 reciprocates screen 108 in a direction (Z-axis direction) parallel to a traveling direction of the laser light. Drive unit 109 is constituted of, for example, an actuator using a coil and a magnet. For example, a holder that holds screen 108 is supported by a base via a plate spring so as to be movable in the direction (Z-axis direction) parallel to the traveling direction of the laser light. The coil is installed on a holder side, and the magnet is installed on a base side. Screen drive circuit 204 drives screen 108 in response to a control signal from image processing circuit 201.

Figure 18A:
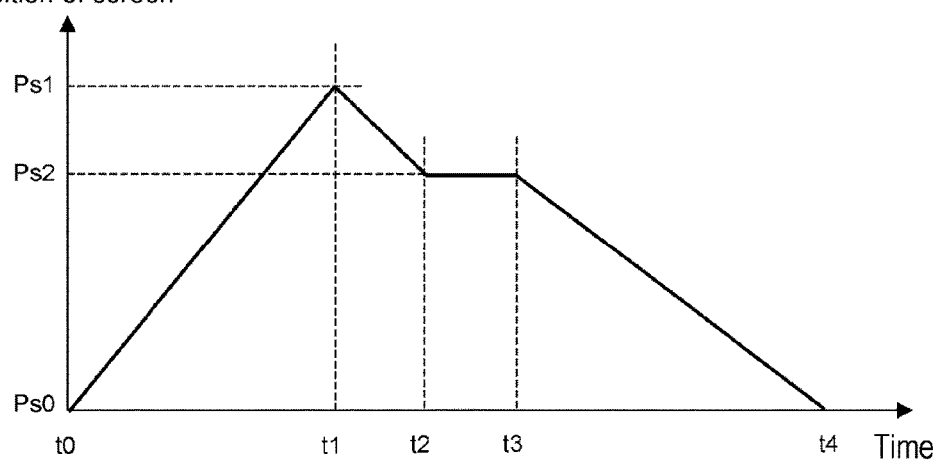
FIG. 18A is a diagram showing an example of a moving process for a screen according to Modification Example 2.
Figure 18B:
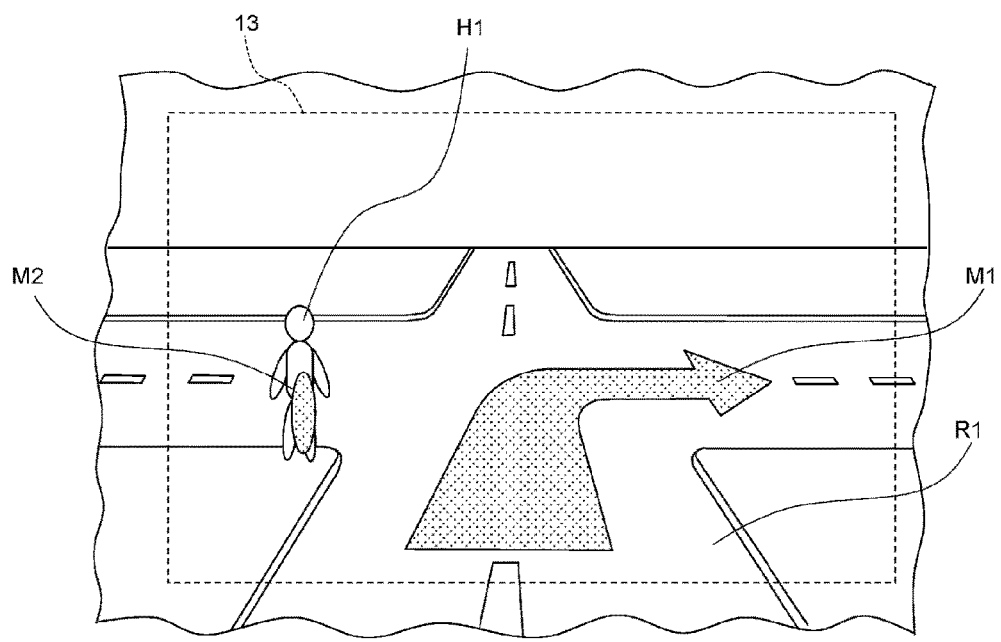
FIG. 18B is a diagram showing an example of an image displayed by moving the screen in the image display device according to Modification Example 2.

FIG. 18A is a diagram showing an example of a moving process for screen 108 according to Modified Example 2, and FIG. 18B is a diagram showing an example of an image displayed by moving screen 108 in image display device 20 according to Modification Example 2.

As shown in FIG. 18A, screen 108 is repeatedly moved from time t0 to time t4, which are taken as one cycle. Between time t0 and time t1, screen 108 is moved from initial position Ps0 to farthest position Ps1, and between time t1 to time t4, screen 108 is returned from farthest position Ps1 to initial position Ps0. A movement cycle of screen 108, that is, a time from time t0 to time t4 is, for example, ⅟60 second.

A period from time t0 to time t1 is a period for displaying depth image M1 spreading in a depth direction in FIG. 18B, and a period from time t1 to time t4 is a period for displaying vertical image M2 spreading in the vertical direction in FIG. 18B. In the example of FIG. 18B, depth image M1 is an arrow for suggesting a direction, in which passenger car 1 should turn road R1, to driver 2 by a navigation function, and vertical image M2 is a marking for alerting driver 2 to the fact that pedestrian H1 is present. For example, depth image M1 and vertical image M2 are displayed in colors different from each other.

During the period from time t0 to time t1, screen 108 is linearly moved from initial position Ps0 to farthest position Ps1. When screen 108 moves, then with this movement, a position at which the virtual image ahead of windshield 12 is formed moves in the depth direction. Hence, when screen 108 is present at each position in the depth direction of depth image M1, laser light sources 101*a* to 101*c* on scan lines corresponding to depth image M1 are caused to emit light at the timing of displaying depth image M1, whereby depth image M1 as shown in FIG. 18B can be displayed as a virtual image in front of projection region 13 of windshield 12.

Meanwhile, vertical image M2 does not change in the depth direction, but spreads only in the vertical direction, and accordingly, it is necessary to fix screen 108 at a position corresponding to vertical image M2 and generate the virtual image. Stop position Ps2 in FIG. 18A is a position of screen 108, which corresponds to the depth position of vertical image M2. During a period of returning from farthest position Ps1 to initial position Ps0, screen 108 is stopped at stop position Ps2 for a while from time t2 to time t3. For this while, laser light sources 101*a* to 101*c* on scan lines corresponding to vertical image M2 are caused to emit light at timing corresponding to vertical image M2, whereby vertical image M2 as shown in FIG. 18B can be displayed as a virtual image in front of projection region 13 of windshield 12.

The above control is performed by image processing circuit 201 shown in FIG. 17. By this control, between time t0 to time t4, depth image M1 and vertical image M2 are displayed as such virtual images. In the above-described control, there occurs a shift between the display timing of depth image M1 and the display timing of vertical image M2; however, since this shift occurs for an extremely short time, driver 2 recognizes an image in which depth image M1 and vertical image M2 are caused to overlap each other. In this way, in front of projection region 13, driver 2 can see images (depth image M1, vertical image M2), which are based on the video signal, while causing the images to overlap a scene including road R1 and pedestrian H1.

Note that, in FIG. 18B, since the vertical image M2 is one, stop position Ps2 of screen 108 is set to one in a process of FIG. 18A; however, if there are a plurality of vertical images M2, then a plurality of stop positions are set accordingly in the process of FIG. 18A. However, in the process of FIG. 18A, the period from time t0 to time t4 is constant, and time t4 is unchanged, and accordingly, a moving speed (slope of a waveform in FIG. 18A) of screen 108 before and after the stop position is changed in response to a fluctuation of the number of stop positions.

Also in this Modification Example 2, the interference fringes generated in image 30 can be suppressed by using the scanning method of the above-described exemplary embodiment.

Other Modification Examples

In the above-described exemplary embodiment, light source 101 is configured to include three laser light sources 101*a* to 101*c*; however, a multi-light emitting laser light source, in which a plurality of light emitting elements having different emission wavelengths are mounted on a substrate of one laser light source, may be used as light source 101. In this case, optical axes of pieces of laser light, which are emitted from the respective light emitting elements, are aligned by, for example, a wavelength-selective diffraction grating.

Moreover, the above-described exemplary embodiment illustrates the example where the present disclosure is applied to the head-up display mounted on passenger car 1; however, the present disclosure is not limited to such an on-vehicle use, but is also applicable to other types of image display devices.

Moreover, the configurations of image display device 20 and irradiation light generator 21 are not limited to the configurations illustrated in FIG. 1C and FIG. 2, and FIG. 17, and are modifiable as appropriate. Furthermore, first lens portions 108*a*, second lens portions 108*b* and lens portions 108*e* may be formed integrally with screen 108, or may have a configuration in which a transparent sheet having these lens portions is attached to a base material of screen 108.

The exemplary embodiment of the present disclosure is modifiable in various ways as appropriate within the scope of the technical idea disclosed in the claims.

The image display device according to the present disclosure is suitable as, for example, an image display device mounted on a movable body such as a passenger car.

What is claimed is:

1. An image display device comprising:
a light source that emits laser light;
a screen on which an image is drawn by being scanned by the laser light;
a scanner that causes the laser light, which is emitted from the light source, to scan the screen; and
an optical system that generates a virtual image of the image, which is drawn on the screen, by the laser light transmitted through the screen, wherein:
the screen is configured such that, in a drawing region on which the image is drawn, a divergence angle is constant in a predetermined range in a center of the screen in a scanning direction, and the divergence angle becomes gradually larger toward ends in side ranges on both sides of the predetermined range of the screen in the scanning direction, the side ranges excluding the predetermined range, and a plurality of lenses are arranged in the predetermined range and each of the side ranges.

2. The image display device according to claim 1, wherein the predetermined range is set in a range of 40% or more to 50% or less of an entire range of the drawing region in the scanning direction.

3. The image display device according to claim 1, wherein the predetermined range is set in a range of the screen where, when an intensity of the laser light that scans the screen is constant, a light quantity of the laser light transmitted through the screen per unit time is 1.2 times or less a light quantity at an intermediate position of the drawing region in the scanning direction.

4. The image display device according to claim 1, wherein:

the plurality of lenses includes a plurality of first lens portions, which diverge the laser light only in the scanning direction, on either one of an incident side and an emission side of the laser light, and a plurality of second lens portions, which diverge the laser light only in a direction perpendicular to the scanning direction, on another one of the incident side and the emission side of the laser light, and the screen is configured such that the divergence angle becomes gradually larger toward the ends in the side ranges by changing a curvature of the plurality of first lens portions included in the side ranges.

5. The image display device according to claim 1, wherein:

the plurality of lenses diverge the laser light individually in both of the scanning direction and a direction perpendicular to the scanning direction, on either one of an incident side and an emission side of the laser light, and the screen is configured such that the divergence angle becomes gradually larger toward the ends in the side ranges by changing a curvature in the scanning direction for the plurality of lenses included in the side ranges.

6. The image display device according to claim 4, wherein the screen includes non-lens regions of a predetermined size, which allow incident light to pass through without diverging the incident light, at positions above and below the drawing region, respectively.

7. A screen on which an image is drawn by being scanned by laser light, wherein:

the screen is configured such that, in a drawing region on which the image is drawn, a divergence angle is constant in a predetermined range in a center of the screen in a scanning direction, and the divergence angle becomes gradually larger toward ends in side ranges on both sides of the predetermined range of the screen in the scanning direction, the side ranges excluding the predetermined range, and a plurality of lenses are arranged in the predetermined range and each of the side ranges.

8. The screen according to claim 7, wherein the predetermined range is set in a range of 40% or more to 50% or less of an entire range of the drawing region in the scanning direction.

9. The screen according to claim 7, wherein the predetermined range is set in a range where, when an intensity of the laser light that scans the screen is constant, a light quantity of the laser light transmitted through the screen per unit time is 1.2 times or less a light quantity at an intermediate position of the drawing region in the scanning direction.

10. The screen according to claim 7, wherein the plurality of lenses include a plurality of first lens portions, which diverge the laser light only in the scanning direction, on either one of an incident side and an emission side of the laser light, and a plurality of second lens portions, which diverge the laser light only in a direction perpendicular to the scanning direction, on another one of the incident side and the emission side of the laser light, and the screen is configured such that the divergence angle becomes gradually larger toward the ends in the side ranges by changing a curvature of the plurality of first lens portions included in the side ranges.

11. The screen according to claim 7, wherein the plurality of lenses diverge the laser light individually in both of the scanning direction and a direction perpendicular to the scanning direction, on either one of an incident side and an emission side of the laser light, and the screen is configured such that the divergence angle becomes gradually larger toward the ends in the side ranges by changing a curvature in the scanning direction for the plurality of lenses included in the side ranges.

12. The screen according to claim 10, wherein the screen includes non-lens regions of a predetermined size, which allow incident light to pass through without diverging the incident light, at positions above and below the drawing region, respectively.

13. An image display device comprising:

a light source that emits laser light;

a screen on which an image is drawn by being two-dimensionally scanned by the laser light;

a scanner that causes the laser light to scan the screen;

an actuator that drives the scanner such that the laser light moves on the screen along a plurality of scan lines parallel to a first direction; and an optical system that generates a virtual image of the image drawn on the screen, wherein:

a plurality of lens regions are arranged on the screen so as to be individually arranged in the first direction and a second direction perpendicular to the first direction, the actuator sets the plurality of scan lines such that a pitch of the scan lines becomes smaller than a pitch of the lens regions in the second direction, the screen includes, in a drawing region on which the image is drawn, a predetermined range at a center of the screen in a scanning direction, in which a divergence angle is constant, and side ranges at both sides of the predetermined range in the scanning direction, in which the divergence angle becomes gradually larger toward ends in the side ranges, and the predetermined range comprises first lens regions of the plurality of lens regions ranged and the side regions comprise second lens regions of the plurality of lens regions.

14. The image display device according to claim 13, wherein a ratio of the pitch of the scan lines to the pitch of the lens regions is set in a range of 0.5 or more to 0.7 or less.

15. The image display device according to claim 13, wherein a ratio of the pitch of the scan lines to the pitch of the lens regions is set to 0.6.

16. The image display device according to claim 13, wherein the light source emits a plurality of types of the laser light having wavelengths different from one another, and an optical axis aligner that aligns optical axes of the plurality of types of the laser light with one another is provided between the light source and the screen.

17. The image display device according to claim 16, wherein a beam shaper that aligns beam sizes and beam shapes of the plurality of types of the laser light is provided between the light source and the screen.

18. The image display device according to claim 16, wherein the plurality of lens regions include a plurality of first lens portions, which diverge the laser light only in the first direction, on either one of an incident surface and an emission surface of the laser light, and a plurality of second lens portions, which diverge the laser light only in a direction perpendicular to the scanning direction, on another one of the incident surface and the emission surface of the laser light, and a region where each of the first lens portions and each of the second lens portions overlap each other as seen in an incident direction of the laser light constitutes one lens.

* * * * *